(12) United States Patent
Brooker et al.

(10) Patent No.: US 12,393,161 B2
(45) Date of Patent: Aug. 19, 2025

(54) DEVICE AND METHOD FOR CALIBRATION-FREE PHASE SHIFTING PROCEDURE FOR SELF-INTERFERENCE HOLOGRAPHY

(71) Applicant: CellOptic, Inc., Rockville, MD (US)

(72) Inventors: Gary Brooker, Rockville, MD (US); Nisan Siegel, Silver Spring, MD (US)

(73) Assignee: CELLOPTIC, INC., Rockville, MD (US)

(*) Notice: Subject to any disclaimer, the term of this patent is extended or adjusted under 35 U.S.C. 154(b) by 398 days.

(21) Appl. No.: 17/543,240

(22) Filed: Dec. 6, 2021

(65) Prior Publication Data

US 2022/0163918 A1 May 26, 2022

Related U.S. Application Data

(63) Continuation-in-part of application No. PCT/US2020/040683, filed on Jul. 2, 2020.

(60) Provisional application No. 63/121,705, filed on Dec. 4, 2020, provisional application No. 62/870,364, filed on Jul. 3, 2019.

(51) Int. Cl.
*G03H 1/04* (2006.01)
*G03H 1/00* (2006.01)
*G03H 1/06* (2006.01)

(52) U.S. Cl.
CPC ......... *G03H 1/0443* (2013.01); *G03H 1/0005* (2013.01); *G03H 1/06* (2013.01); *G03H 2001/005* (2013.01); *G03H 2001/0452* (2013.01); *G03H 2222/31* (2013.01)

(58) Field of Classification Search
CPC ...... G03H 1/0443; G03H 1/0005; G03H 1/06; G03H 2001/005; G03H 2222/31; G03H 2001/0458
USPC ....................................... 359/1, 35; 356/457
See application file for complete search history.

(56) References Cited

U.S. PATENT DOCUMENTS

| | | | |
|---|---|---|---|
| 10,453,211 B1* | 10/2019 | Christensen | G03H 1/0005 |
| 2008/0309854 A1* | 12/2008 | Ge | G02F 1/13363 349/98 |
| 2009/0303559 A1 | 12/2009 | Rosen | |
| 2016/0357146 A1 | 12/2016 | Brooker | |
| 2017/0242398 A1 | 8/2017 | Brooker | |

(Continued)

OTHER PUBLICATIONS

"In-line Finch super resolution digital holographic fluorescence microscopy using a high efficiency transmission liquid crystal Grin lens", Optics Letters vol. 38, No. 24, 5264-5267/Dec. 2013. (Year: 2013).*

(Continued)

*Primary Examiner* — Audrey Y Chang
(74) *Attorney, Agent, or Firm* — Nixon & Vanderhye P.C.

(57) ABSTRACT

An apparatus and method are introduced to produce a hologram of an object from electromagnetic radiation, such as incoherent light, received from the object. The electromagnetic radiation is received by a receiving assembly and transformed into a plurality of co-linear co-propagating beams with different focal distances. The interference of the plurality of beams is enabled by projecting components of each beam along a common polarization direction. The interference patterns thus formed are recorded and then processed to form the hologram of the object.

17 Claims, 14 Drawing Sheets

(56) References Cited

U.S. PATENT DOCUMENTS

2018/0143587 A1     5/2018   Brooker et al.
2019/0346811 A1*   11/2019   Min ...................... G03H 1/041

OTHER PUBLICATIONS

European Patent Office extended European Search Report for Application No. 20834451 dated Jan. 25, 2024, 7 pages.
Tatsuki Tahara et al "Single-Shot-Phase-Shifting Incoherent Digital Holography", Journal of Optics, Institute of Physics Publishing, Bristol GB, vol. 19, No. 6, May 22, 2017.
Dong Liang et al "Single-Shot Fresnel Incoherent Digital Holography Based on Geometric Phase Lens" Arxiv.Org, Cornell University Library, 201 Olin Library Cornell University Ithaca, NY, Nov. 16, 2018.

* cited by examiner

DEVICE AND METHOD FOR CALIBRATION-FREE PHASE SHIFTING PROCEDURE FOR SELF-INTERFERENCE HOLOGRAPHY

CROSS REFERENCE TO RELATED APPLICATIONS

This application is a continuation-in-part of PCT Application No. PCT/US2020/040683 filed on Jul. 2, 2020, which claims priority to U.S. Provisional Application 62/870,364 filed Jul. 3, 2019. This application also claims priority to U.S. Provisional Application 63/121,705 filed on Dec. 4, 2020. The entire content of PCT Application No. PCT/US2020/040683, U.S. Provisional Application 62/870,364 and U.S. Provisional Application 63/121,705 is hereby incorporated by reference.

TECHNICAL FIELD

This disclosure generally relates to an apparatus and method for recording a hologram for an object derived from electromagnetic radiation received from the object, and more particularly to the processing of the recorded hologram and reconstruction of super-resolved image data describing the object.

BACKGROUND

Conventional imaging forms images of objects, wherein the image contains intelligible data only about a single plane of the object. Holographic imaging methods record intelligible data about multiple planes of an object in single two-dimensional image recording but require complex illumination methods and carefully controlled imaging conditions. To overcome this, FINCH (Fresnel Incoherent Correlation Holography) creates holograms from the received light from an object, without requiring the light to be coherent, and without placing other constraints on the imaging environment. However, FINCH may require wavelength calibration of optical components used for shifting the phase of the recorded light patterns, as well as recordings of multiple phase-shifted light patterns (phase factors).

SUMMARY OF EXAMPLE EMBODIMENTS

A method of performing FINCH holography that avoided wavelength calibration for phase shifting and could record multiple phase factors in a single exposure would provide great advantages over previous FINCH holographic technology.

Accordingly, one object of the present disclosure is to provide an apparatus in which light received from the object is transformed into a plurality of co-linear co-propagating beams, each of which carries information about the object and each of which has a unique spherical phase curvature (focal length). The plurality of beams is caused to interfere in multiple phase factors without requiring wavelength calibration for the control of the phase factor. Subsequently, the multiple interference pattern phase factors are recorded sequentially and then processed to form the hologram of the object and an image of the object derived from the hologram.

Another object of the present disclosure is an apparatus in which light received from the object is transformed into a plurality of colinear copropagating beams, each of which carries information about the object and each of which has a unique spherical phase curvature (focal length). The plurality of beams is caused to interfere in multiple phase factors without requiring wavelength calibration for the control of the phase factor. The multiple phase factors of the interference are recorded in a single image capture. Subsequently, the interference patterns thus recorded are processed to form the hologram of the object and an image of the object derived from said hologram.

Another object of the present disclosure is an apparatus that produces two geometrically separated interference recordings from light received from an object. Each interference recording contains data sufficient to produce the hologram of the object. The concurrently recorded interference recordings are processed together to increase the signal-to-noise ratio of the hologram.

Another object of the present disclosure is a calibration-free apparatus to create super-resolution images of an object or scene in a single exposure, the apparatus comprising an optical assembly to receive light from an object, transform said light into a pair of differentially focused beams with orthogonal circular polarizations, and cause a recording of the interference of the two beams at an image recording plane; wherein the transformation of the light is accomplished by the application of a birefringent lens, and wherein the conversion to circularly polarized light beams is accomplished by a broadband quarter-wave plate, and wherein the interference is created by directing the beam pair to an image detector in which every pixel is registered to a micropolarizer array containing multiple sets of polarizer elements with predefined linear polarization orientations, wherein the interference recording is further processed computationally to recover the object hologram and super-resolved image.

One skilled in the art will realize that the above objects of the disclosure are discussed in terms of light but that the concepts therein apply to electromagnetic radiation of any other wavelength as well.

BRIEF DESCRIPTION OF THE DRAWINGS

FIG. 5a illustrates recordings of a FINCH holograms of a laser beam performed by a device of the type of embodiment in FIG. 4a.

DETAILED DESCRIPTION OF EXAMPLE EMBODIMENTS

Inventors of the subject matter in this disclosure include an inventor of the Fresnel Incoherent Correlation Holography (FINCH) techniques and systems that are described in, for example, U.S. Pat. No. 8,179,578 filed Jul. 18, 2006. The inventors of FINCH also published several papers describing the FINCH system and technique. See, for example, Joseph Rosen and Gary Brooker, "Digital spatially incoherent Fresnel holography", Optics Letters, Vol. 32, No. 8, Apr. 15, 2007. The contents of U.S. Pat. No. 8,179,578 and the publication "Digital spatially incoherent Fresnel holography" noted above are each incorporated by reference in their respective entireties. However, a brief description of FINCH is provided below for convenience.

FINCH is a single beam interferometric method that can create an interference pattern (also referred to as a hologram or a recorded hologram or a raw hologram) from visible light or any kind of electromagnetic radiation, either incoherent or coherent. In order to obtain a complex-valued 3D image representation of a scene captured by the FINCH technique (also referred to as a complex hologram), a plurality of recorded holograms must be recorded. This plurality of recorded holograms or interference patterns must include at least two "phase shifted" holograms, each with a unique phase factor. The plurality of holograms is typically obtained in a serial manner or in a parallel manner by a variety of beam-splitting techniques.

Figure 1A:
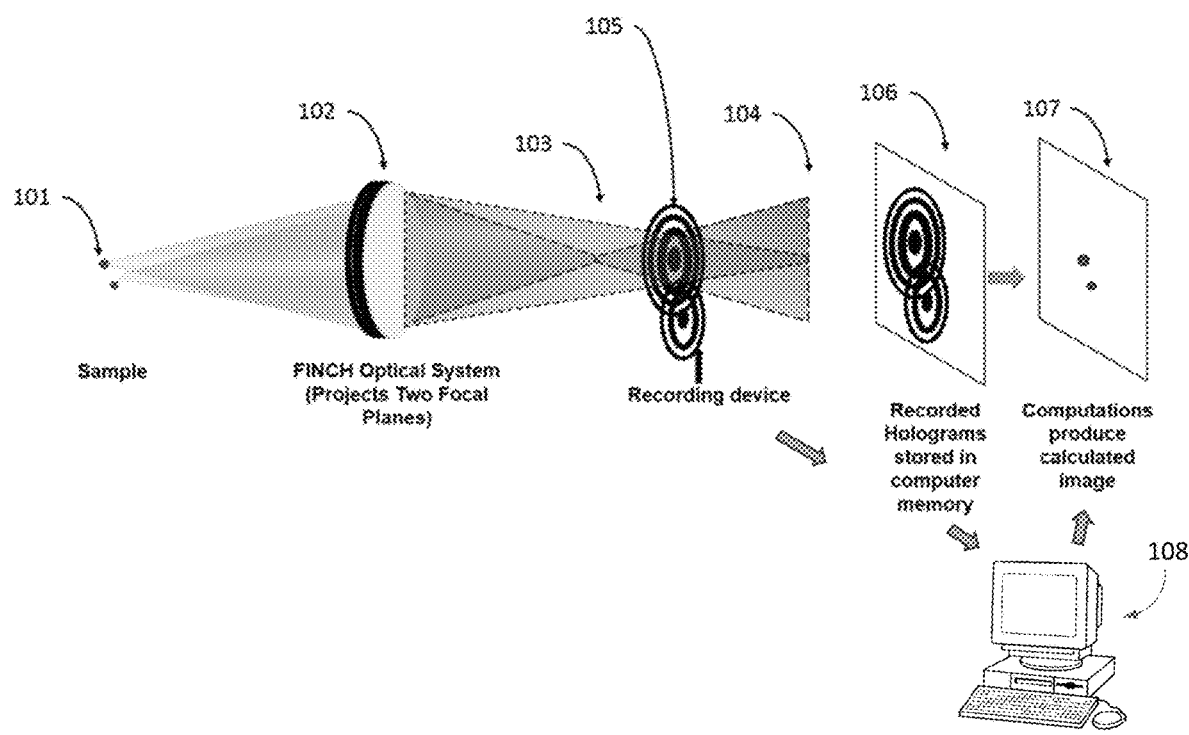
FIG. 1a is a schematic depicting the formation of FINCH holograms of a point in a sample object.

FIG. 1a illustrates a generalized FINCH imaging system. An object (also referred to as sample) 101 emits or reflects light toward the FINCH optical system 102, which receives the light through a lens or other aperture and produces (from any single received beam of light) two co-propagating beams (e.g. 103, 104) with distinct phase curvatures. The two co-propagating beams are directed to a recording device in a manner that allow them to produce an interference pattern 105, which is then recorded by an image recording device (not shown) and stored 106 for subsequent calculated reconstruction of the image 107 computed in a computing device 108. As noted above, multiple phase-shifted interference patterns (raw holograms) are recorded and stored for use in creating a complex hologram and calculated reconstructed images. The method of formation of the complex hologram and the reconstruction process are described in detail in references 1-5, 7-9 and are thus saved from detailed reiteration here. Briefly, the recorded holograms with different phase factors are super-imposed on each other in a computing device by the following operation:

$$H_F = \Sigma_{n=1}^{n_{max}} H_n(x,y)[\exp(\pm i\theta_{n-1}) - \exp(\pm i\theta_{n+1})]; \quad \text{(equation 1)}$$

wherein $H_F$ is the complex hologram, $H_n$ are the raw or recorded holograms (interference patterns), and n the index of the phase shift of a given raw hologram, with $n_{max}$ phase shifted images, and $\theta_{n-1} = \theta_{n_{max}}$, for n=1, and $\theta_{n+1} = \theta_1$, for $n = n_{max}$. The complex hologram is then reconstructed into a 2D image s representing a single in-focus plane by one of a number of different computational operations. One common method is Fresnel Propagation, exemplified in the following equation:

$$s(x, y, z_{rec}) = H_F(x, y) * \exp\left[\left(\frac{i\pi}{\lambda z_{rec}}\right)(x^2 + y^2)\right], \quad \text{(equation 2)}$$

wherein the asterisk represents a 2D convolution operation, $z_{rec}$ is the desired distance of the in-focus plane at which the hologram is to be reconstructed, and the exponential term is a propagation function for optical propagation by a distance of $z_{rec}$. Other image reconstruction methods may be applied, including angular spectrum reconstruction, image inversion, compressive sensing and deep learning computations, amongst others. The reconstructed image is then displayed on a computer monitor or other suitable display device. Note that equation 2 or another reconstruction operation may be repeated many times for any different $z_{rec}$ as desired to create a three-dimensional collection of images.

Figure 1B:
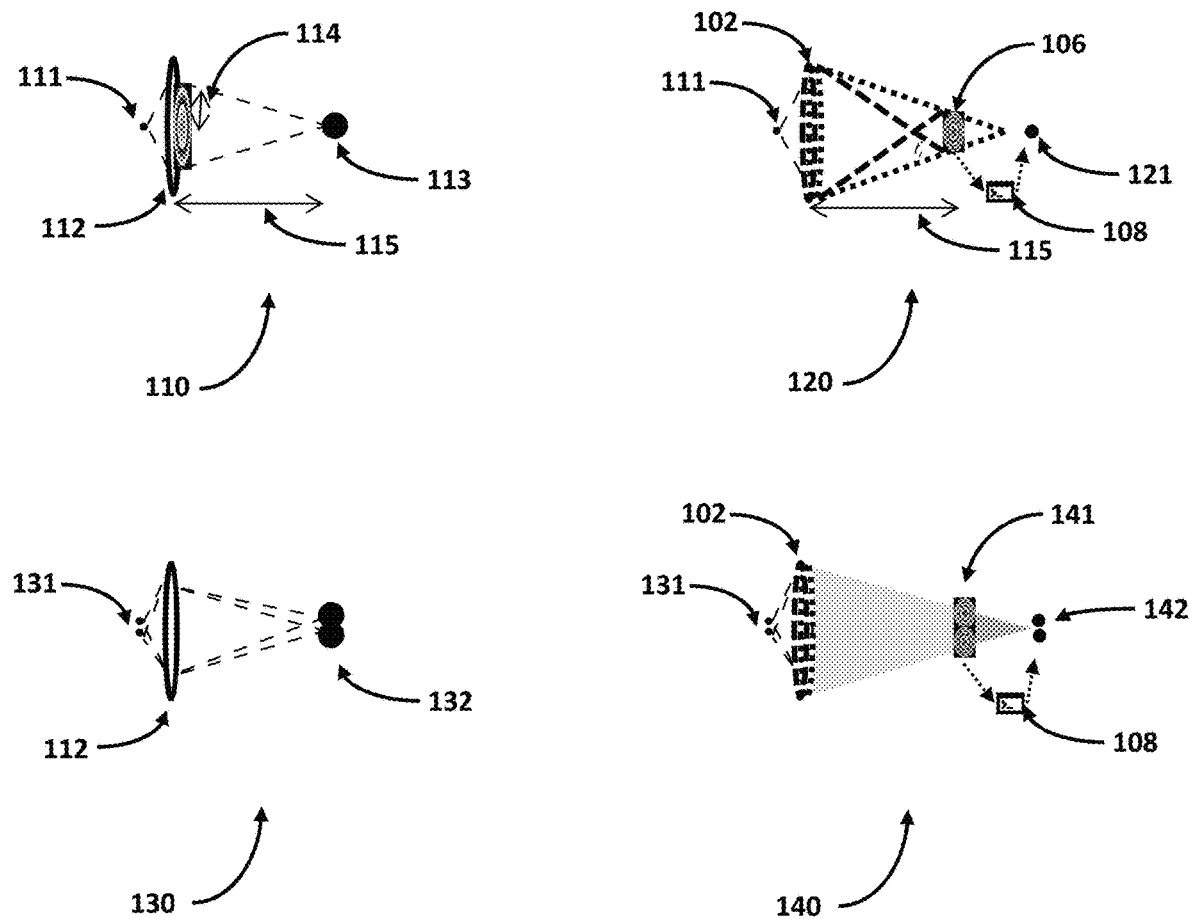
FIG. 1b is a schematic depicting the optical resolution of standard optical imaging and FINCH imaging.

FINCH imaging is also capable of optical super-resolution, in which objects that are close to each other may be resolved as separate objects in a FINCH image even though they are not resolved as separate objects in a standard (or "classical") image. Referring to FIG. 1b and considering a single infinitesimally small object 111, classical optical imaging 110 simply requires a lens 112 to receive light from 111 and focus that light into an image 113, magnifying the object by the blurring function known as the point-spread function (PSF). A given conical angle of the light emitted from the object point 111, with a finite circular projection on the plane of the lens 112, is accepted by the lens. The accepted light beam, with radius 114 $R_{beam}$, along with the distance 115 $d_i$ to the image plane, may be thought of as a lens with an effective numerical aperture $NA_{beam} = R_{beam}/d_i$, and the classical image spot size $\Delta_i$ of the object point is inversely proportional to this effective NA (numerical aperture). Referring to the representation 120 of FINCH imaging of a single infinitesimal object 111 using a FINCH optical system 102 located the same distance away from the object 111 as a classical lens 112 shown in 110, the number and size of the fringes in the hologram 106 encode the depth of the object point being reconstructed, conferring on FINCH the ability to encode three-dimensional (3D) information. The self-interference of the light confers a super-resolution factor of up to twice the normal optical limit at any given wavelength by incorporating sample information in both light beams that interfere. That is, there are two signal beams rather than the individual signal and reference beams that are characteristic of classical holography. The largest increase in resolution occurs at the plane in which the two differentially focused beams have the same diameter. If a FINCH system is arranged so that the plane at which the hologram is recorded is at the distance 115 $d_i$ from the FINCH optical system, it has been shown [Reference 7] that the resultant hologram has an effective NA ($NA_H$) of its own, which is equal to $2NA_{beam}$. Upon the reconstruction calculation in computing device 108 by equation 2 or other methods, the final spot size of the FINCH image 121 is thus inversely proportional to twice the $NA_{beam}$, leaving it as half the width of the classically imaged spot. Since the lateral magnification of FINCH is the same at any distance from the optical system as that in classical imaging, this results in the lateral resolution of FINCH being twice that of classical imaging in this optimal arrangement. This is further illustrated in another classical imaging diagram 130, in which the classical lens 112 cannot use the light received from a pair 131 of closely spaced object points that to create a classical image 132 that resolves (separates) the images of the two points in the pair 131. In diagram 140, depicting a FINCH system 102 imaging the same pair of points 131, the recorded hologram 141 is processed by the computing device 108 to an image 142 that does resolve the pair of points as separate from each other, showing that FINCH does not adhere to the classical Lagrange invariant that describes lateral magnification in classical optical systems. FINCH violates the classical Lagrange invariant and thus improves both single and two-point lateral resolution.

One of the unique aspects of FINCH is that, unlike interferometric techniques which require a "test beam" (also referred to as sample beam or signal beam) and a "reference beam" to be interfered with each other, FINCH uses two test beams to be interfered with one another. FIG. 32 in the above noted U.S. Pat. No. 8,179,578 illustrates a typical conventional non-FINCH holographic system. In said FIG. 32, 9012 is the reference beam and 9010 is the test or sample beam.

In interferometry, the test beam is the light that returns from the sample (also referred to as object) being measured. In many interferometers, all the information about the sample being investigated is included in the test beam. The reference beam, in contrast, is a well-characterized beam that is either brought directly from the source (for example a single mode laser beam) or which returns from a well-characterized standard reference. The reference beam carries no information about the sample.

For example, if it was desired to see what shape (e.g. how flat) a newly made mirror is, it is possible to use an interferometer to compare it to a mirror that is known to be perfectly flat. The new mirror (e.g. the sample) is placed in one leg of an interferometer, and the perfect mirror in another leg of the interferometer (e.g. the reference leg). A light source is then directed through the interferometer to create interference between the light that returns from each leg. Since there is precise knowledge of what the beam from the reference leg should look like, the interference pattern that is actually obtained contains information about any differences in the shape of the test mirror. Any deviations from a perfect interference pattern can only be attributed to the new mirror, and it is possible to calculate what the test mirror shape must be.

The use of two test beams, as in FINCH, is better than the use of a test beam and a reference beam at least because: both test beams carry information about the sample, and therefore their interference enables super-resolution of up to twice the standard resolution of the single test beam case and single reference beam case; and with two test beams, all of the light from the sample and no non-informative reference light is used to form the interference with maximum interference efficiency, resulting in the maximum possible signal and minimum possible background.

Some inventors of the subject matter described in this application subsequently improved upon the original FINCH technique described in U.S. Pat. No. 8,179,578, leading to, in one particular improved implementation, using one or more birefringent lenses in association with FINCH in order to achieve super resolution in the obtained holographic images. U.S. Pat. No. 10,228,655 (which claims priority to U.S. Provisional Application 61/886,064 filed on Oct. 3, 2013) describes FINCH using a liquid crystal lens (which is also birefringent). The use of a birefringent crystal lens in FINCH was described in a provisional application that was filed May 1, 2014, which claimed priority to U.S. Pat. Nos. 10,289,070, 10,423,123, and 10,591,870. This novel use of a birefringent lens in FINCH was also described in Nisan Siegel, Vladimir Lupashin, Brian Storrie and Gary Brooker, "High-magnification super-resolution FINCH microscopy using birefringent crystal lens interferometers", Nature Photonics, 14 Nov. 2016. The contents of U.S. Pat. Nos. 10,228,655, 10,289,070, 10,423,123, and 10,591,870 and US patent application 20170185036, and "High-magnification super-resolution FINCH microscopy using birefringent crystal lens interferometers" are each incorporated by reference in their respective entireties.

Figure 2:
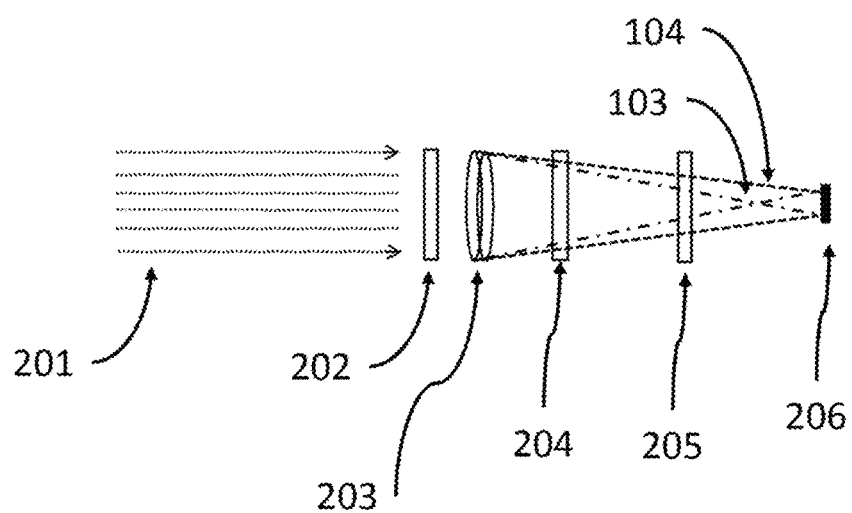
FIG. 2 is a schematic depicting the formation of two differentially focused beams from a single beam received by a birefringent lens.
Figure 3:
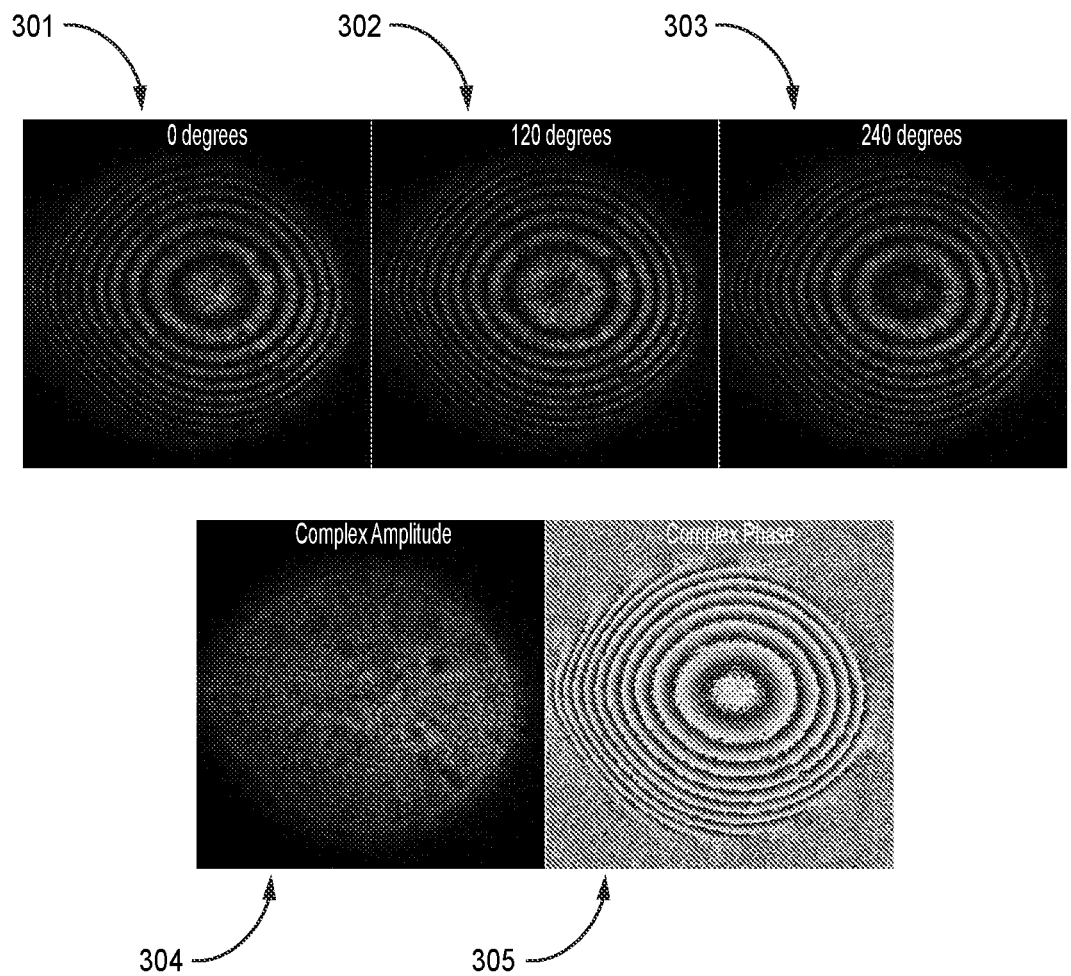
FIG. 3 recordings of FINCH holograms of a laser beam.

In the current state of the art FINCH using birefringent lenses (e.g. see FIG. 2), the two co-propagating beams 103, 104 are produced by polarizing the incoming light 201 at an input polarizer 202 before it reaches the FINCH birefringent lens assembly 203 so that the light is polarized and +45° and −45° relative to the ordinary and extraordinary refractive indices of the birefringent optics. The birefringent lens assembly 203 includes at least one birefringent lens as well as any other optics necessary to transform the beam, including chromatic correction lenses, standard converging or diverging lenses, birefringent compensating optics, and any other optics necessary to achieve the interference of the beams as well as a final image that is free of aberrations. The birefringent optic thus separates the incoming beam into two outgoing beams, polarized along the ordinary and extraordinary refractive indices, each with its own phase curvature that is a function of the incoming phase curvature and the birefringent lens curvature and respective refractive index. Subsequent to the birefringent lens assembly 203, the overall phase of one of the beams is changed by a dynamic and variable phase-shifting optic 204 before both beams are passed through an output polarizer 205 that projects parts of both beams along a common axis to permit mutual interference at the interference recording plane 206. Sequential images with differing phase shifts (created by the dynamic phase-shifting optic) are recorded and used to calculate images free from the effects of bias and twin image noise that are characteristics of on-axis holograms. Generally, the phase shifting optic used is a variable waveplate that delays light of either the ordinary or extraordinary polarization before it reaches the output polarizer. An example hologram of a laser beam taken with such a system is shown in FIG. 3, displaying three "raw" phase shifted holograms 301, 302, 303 as well as the recovered amplitude 304 and phase 305 of the complex hologram.

The present inventors realized that the already improved super resolution provided by birefringent lens-equipped FINCH can be further enhanced by acquiring at least a required minimum number of "phase shifted" holograms simultaneously, instead of serially as in the previous implementations. It should be noted that, although embodiments are described in relation to birefringent lens-equipped FINCH, certain other improvements by one or both of the present inventors introducing the use of polarization to the originally proposed FINCH, such as, for example, SLM (spatial light modulator) or GRIN (gradient refractive index)

lens equipped FINCH, may also be further enhanced by acquiring at least a required minimum number of "phase shifted" holograms simultaneously.

Some techniques have been proposed by others for achieving multiplexed recording of phase shifted interference patterns in a single image capture (also referred to as "single shot" or "single exposure") by using a different polarization scheme in the raw hologram formation. Examples are: Nobukawa T, Muroi T, Katano Y, Kinoshita N, Ishii N, "Single-shot phase-shifting incoherent digital holography with multiplexed checkerboard phase gratings", Optics Letters 43(8)1698 (2018); Choi K, Yim J, Min S-W, "Achromatic phase shifting self-interference incoherent digital holography using linear polarizer and geometric phase lens", Optics Express 26(13) 16212 (2018); Awatsuji Y, Fujii A, Kubota T, Matoba O, "Parallel three-step phase-shifting digital holography", Applied Optics 45(13) 2995-3002 (2006); Millerd J, Brock N, Hayes J, North-Morris M, Novak M, Wyant J, "Pixelated phase-mask dynamic interferometer", Proceedings of SPIE Vol 5531 Issue 520 p 304-314 (2004); U.S. Pat. Nos. 8,351,048; 6,304,330; 7,230,717; 7,777,895. Many of these single shot techniques, however, have drawbacks in that they often require image registration that is difficult to achieve, or difficult optical geometries, all of which reduce image resolution. Moreover, many of these single shot systems proposed previously require a test beam and a reference beam.

FINCH is a form of self-interference interferometry in which the interference is created from two copies of the beam coming from the sample, i.e. two test beams. FINCH, while an interferometer with orthogonally polarized beams, does not have a reference beam as is the case in some conventional holography. As noted above, FINCH requires two test (sample) beams that interfere with one another. This is a substantial difference that changes what information can be obtained from the interferometer. Significantly, it is the fact of having two test beams that allows FINCH to achieve high spatial super-resolution that classical imaging methods and other holography methods do not, and from conventional non-FINCH interferometer methods with test and reference beams.

In the case of FINCH, each copy of the beam has all the object information in it. Thus, the interference pattern obtained in FINCH can be thought of (colloquially) as "amplifying" the sample information.

In contrast to FINCH which "amplifies" the sample information, some conventional techniques use a reference beam that is weaker than the test beam, and thus cannot achieve maximum efficiency in the obtained interference. In some cases, the reference beam created is weaker than the test beam by as much as 99:1 and therefore an efficiency loss of converting light from the sample into interference is observed.

In some instances a point diffraction ("PDI") optic is used to produce a reference beam from a filtered copy of the test beam from the sample, this technique used to create the reference beam erases all the sample information, and thus cannot "amplify" the sample information as in FINCH. The reference beam in U.S. Pat. Nos. 8,351,048, 6,304,330, 7,230,717, and 7,777,895, is truly a reference beam in that it has no sample information. Moreover, in contrast, for FINCH the ratio of the two beam intensities is 50:50, and thus the maximum efficiency in converting light into interference is obtained.

The present inventors discovered that a modification of the polarization scheme typically used to create the test FINCH beams could be used to create higher quality holograms than those that are produced by our other techniques described in U.S. Pat. Nos. 10,228,655, 10,289,070, 10,423,123, and 10,591,870 and patent application 20170185036, and "High-magnification super-resolution FINCH microscopy using birefringent crystal lens interferometers". The improved quality may at least in part be the result of the absence of incorrect calibration and stability of the phase shifter at any wavelength or bandwidth and the fact that more sample information creates the hologram.

Further, when a FINCH system is adapted with a polarization scheme as noted above, it also permits single shot recording, and it is then possible to advantageously apply the system to imaging that particularly benefits from single shot recording, including for example, chemiluminescent or bioluminescent imaging, or any low light system in which long exposures might exacerbate the problems inherent in sequential recording as listed above, i.e. the sample must not change during the recording of the interference patterns necessary to reconstruct the scene.

Figure 4A:
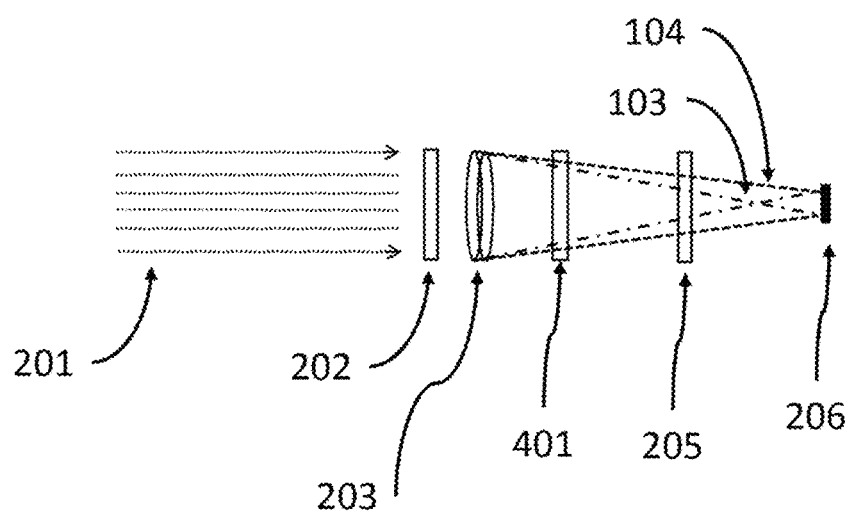
FIG. 4a illustrates an example embodiment using birefringent lenses and a quarter-wave plate to create differentially focused circularly polarized beams from received light, and a single polarizing element to bring the two beams to interfere.

An embodiment of the current invention is illustrated in FIG. 4a. In FIG. 4a, the incoming object light 201 is linearly polarized at an input polarizer 202 and passed through the birefringent lens optics 203 such as, for example, in U.S. Pat. Nos. 10,228,655, 10,289,070, 10,423,123, and 10,591,870 and patent application 20170185036, and "High-magnification super-resolution FINCH microscopy using birefringent crystal lens interferometers", producing two differentially focused beams with orthogonal linear polarizations. Then, distinctly, a quarter-wave plate 401 is placed in the beam path, with its slow axis aligned ±45 degrees to the ordinary and extraordinary axes of the birefringent lens. This has the effect of turning the linearly polarized light from the birefringent lens into circularly polarized light, one beam with right handed circular polarization and one with left-handed circular polarization. In some embodiments, this waveplate may be a broadband waveplate that applies the same quarter wave phase shift to every incoming wavelength over its range and does not need to be calibrated. The two circularly polarized beams may be brought to interfere by passing them through a linear polarizer 205. The angle of the polarizer transmission axis with respect to the waveplate slow axis controls the phase of the interference between the two beams (note that for some embodiments the exact angle of polarization needs to be known for each degree of polarization, but the angle of polarization shift can be less precise and compensated for in software by an iterative software routine to obtain the best image of a test pattern). Multiple phase shifted holograms may then be recorded sequentially, by rotating the polarization axis of an output polarizer 205 placed in a plane between the quarter-wave plate and the interference detection plane 206.

Figure 4B:
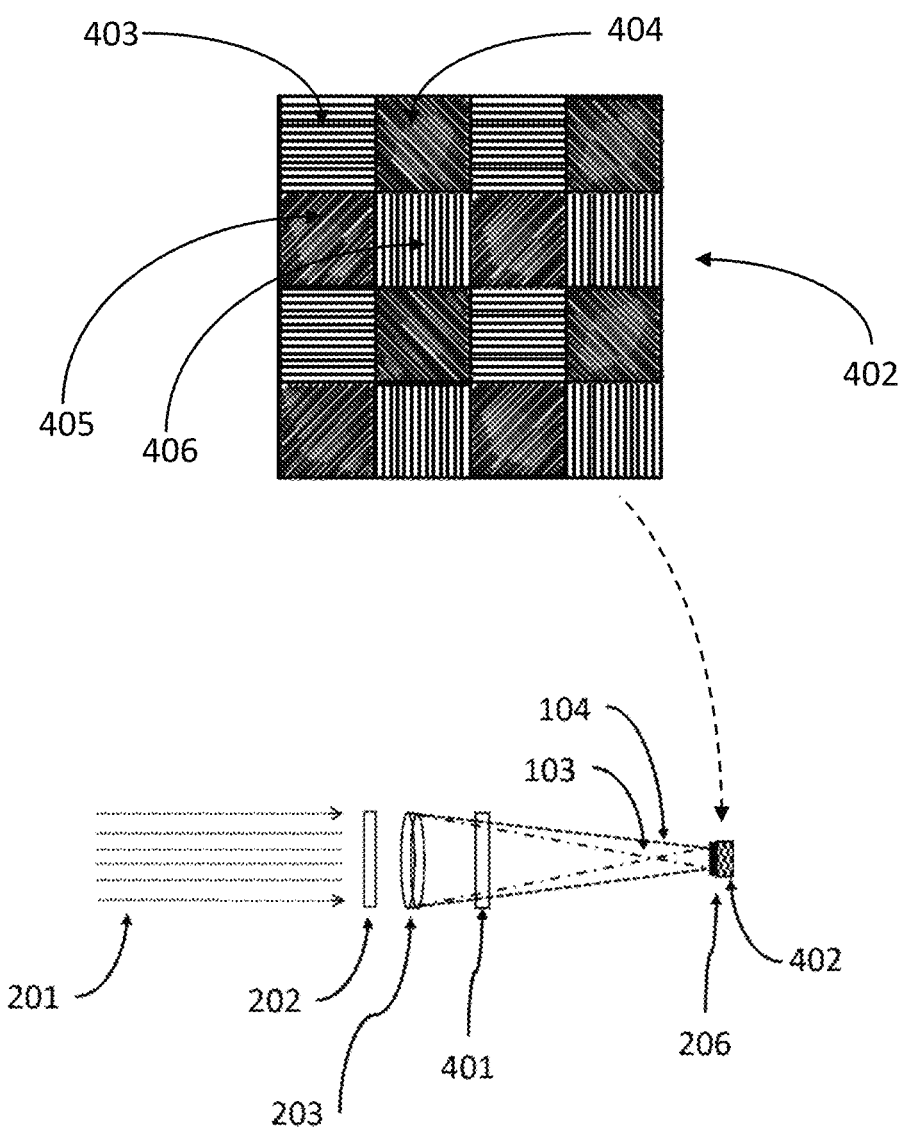
FIG. 4b illustrates an example embodiment using birefringent lenses and a quarter-wave plate to create differentially focused circularly polarized beams from received light, and an array of polarizing elements to cause interference of the beams.
Figure 4C:
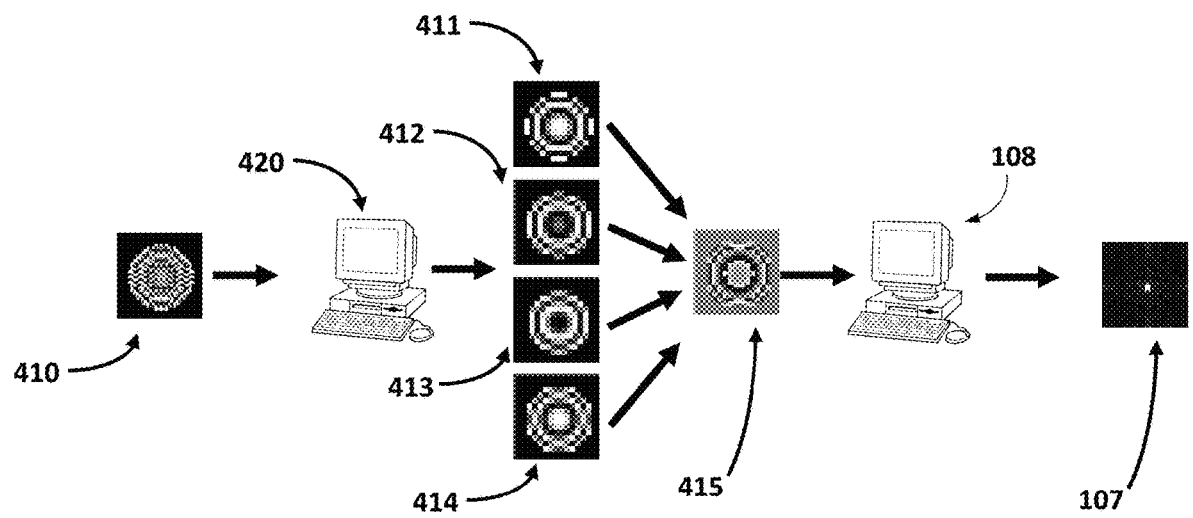
FIG. 4c illustrates the process of constructing four separate phases of a hologram from a single interference image recorded with interspersed phases.

Another embodiment of the present invention is illustrated in FIG. 4b. In FIG. 4b, the incoming object light 201 is linearly polarized at an input polarizer 202 and passed through the birefringent lens optics 203 such as, for example, in U.S. Pat. Nos. 10,228,655, 10,289,070, 10,423,123, and 10,591,870 and patent application 20170185036, and "High-magnification super-resolution FINCH microscopy using birefringent crystal lens interferometers". Then, distinctly, a quarter-wave plate 401 is placed in the beam path, with its slow axis aligned ±45 degrees to the ordinary and extraordinary axes of the birefringent lens. This has the effect of turning the linearly polarized light from the birefringent lens into circularly polarized light, one beam with right-handed circular polarization and one with left-handed circular polarization. In some embodiments, this waveplate may be a broadband waveplate that applies the same quarter-wave phase shift to every incoming wavelength over its range and does not need to be calibrated. The two circularly polarized beams may be brought to interfere by passing them through an array 402 of differentially aligned micropolarizers of varying polarization orientations 403, 404, 405, 406 overlaying the image sensor at interference detection plane 206 wherein each micropolarizer is of the size of one of the detector pixels and is registered to a specific detector pixel. The angles of the polarizer transmission axes of the micropolarizers with respect to the waveplate slow axis controls the phase of the interference between the two beams recorded at the detector pixel registered to each micropolarizer. Multiple phase shifted holograms may then be recorded simultaneously. For example, in one embodiment, the micropolarizer array may contain micropolarizers with transmission axis orientation of 0°, 90°, 180°, and 270° (or −90°) with respect to the quarter wave plate, resulting in the collection of multiple phase shifted raw holograms with relative phase shifts of 0, $\pi/2$, $\pi$, and $3\pi/2$ radians (or 0°, 90°, 180°, and 270°). The micropolarizers may be of any convenient set of axis orientations to produce multiple holograms with any desired set of relative phase shifts. Following the recording of the raw holograms, the different phase shifted holograms may be separated from each other in the computing device. This results in a set of holograms, each of which has a quantity of blank pixels equal to (device pixel count)*(n−1)/n, where n is the number of phase shifts used. FIG. 4c illustrates an exemplary embodiment of separating multiple individual phases of a hologram from an interspersed hologram recorded on a micropolarizer camera. The recorded hologram 410 possess a set of four holograms of different phases, each recorded by a quarter of the pixels overlaid with a particular micropolarizer orientation such as 0°, 90°, 180°, or 270° as discussed above. The different phases are, in a computing device 420, abstracted from the recorded hologram into independent holograms 411-414. The computing device 420 may be identical with the computing device 108 that produces the reconstructed image of the object, or else 420 may be a separate computing device, including a computing device embedded in the camera that records the interspersed hologram. The four holograms 411-414 as noted above each have blank pixels. These pixels, or the blank pixels of any similarly obtained set of interspersed holograms or images, may reassigned with values calculated by nearest neighbor or other interpolation methods, to maintain the sampling interval of the imaging device. A recentering operation of single-pixel sifting the interpolated data may optionally be performed in order to improve the overlap of the raw holograms. Alternatively, the blank pixels may be removed and the sampling interval of the image data increased by a factor appropriate to the number of phase shifts recorded. For example, if four phase shifted raw holograms were recorded on a sensor of the type described in the current embodiment of 2048×2048 pixels of 5 micron pitch, each raw hologram would have (2048*2048)*(4−1)/4=3,145,728 blank pixels. These pixels could be filled with interpolated data, or simply be removed, with a concomitant reassignment of the sampling pitch to 10 microns. In any of these cases, the individual phase shifted holograms may then be combined into a complex hologram 415 as described above and in the incorporated literature, and then processed further in a computing device 108 to produce the reconstructed image 107 of the object recorded in the hologram 410.

Since polarizers isolate a single polarization component of incident light uniformly, regardless of precise wavelength over a broad wavelength band of light, the combination of the broadband quarter wave plate and interference formation by polarizer rotation as in the embodiment described in FIG. 4a results in a FINCH system with truly achromatic, calibration-free phase shifting and therefore with optimized phase recording of the interference patterns. Use of the embodiment described in FIG. 4b for simultaneous single shot recording addresses further aspects that affect the quality of recorded FINCH holograms, by eliminating considerations of long exposure time, photodamage of photosensitive objects, and sample motion between sequential exposures. In summation, it is an all optical system, free of any electronic or mechanical adjustments during image recording, that is capable of producing holograms in a single exposure with precise and reproducible phase shifts.

Figure 5A:
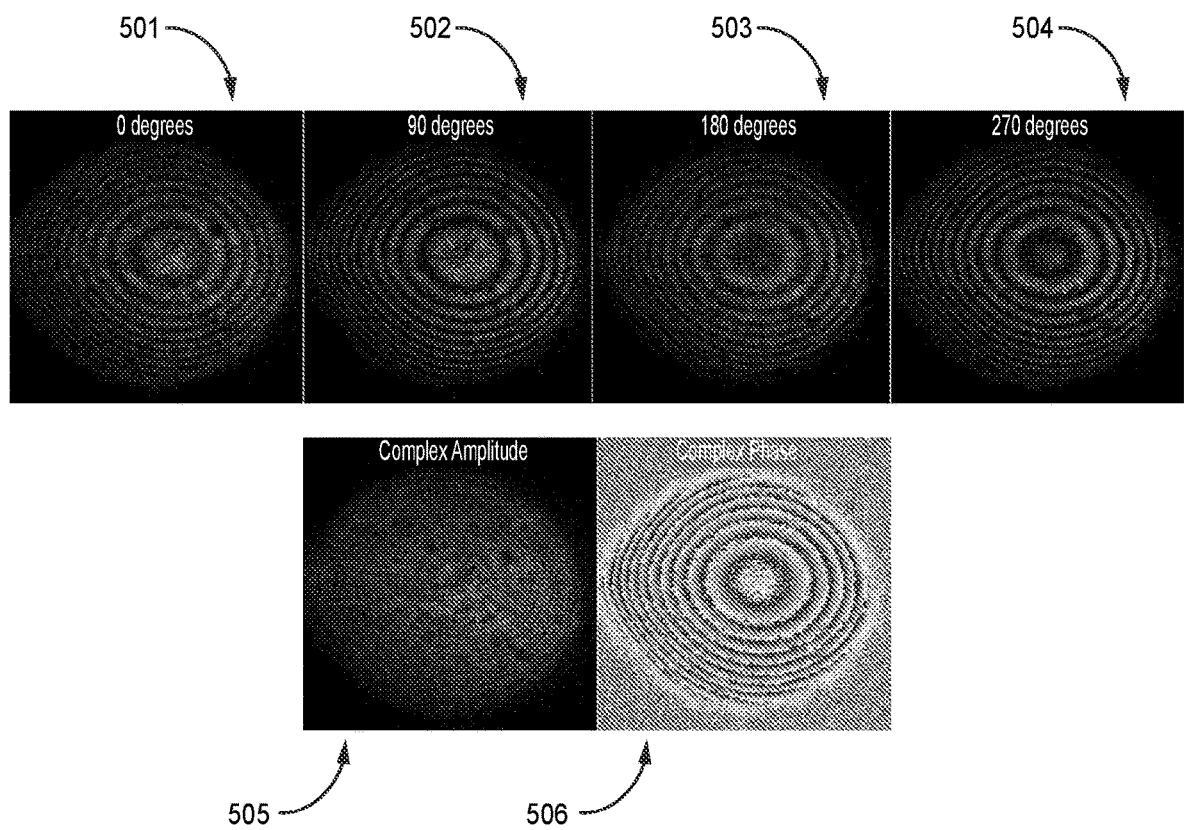

Sample data from the example embodiment shown in FIG. 4a, with sequential interference pattern acquisition, is shown in FIG. 5a, displaying four "raw" phase shifted holograms 501, 502, 503, 504 of a laser beam used as a model source object simulating an infinitesimal object point as well as the recovered amplitude 505 and phase 506 of the complex hologram.

Figure 5B:
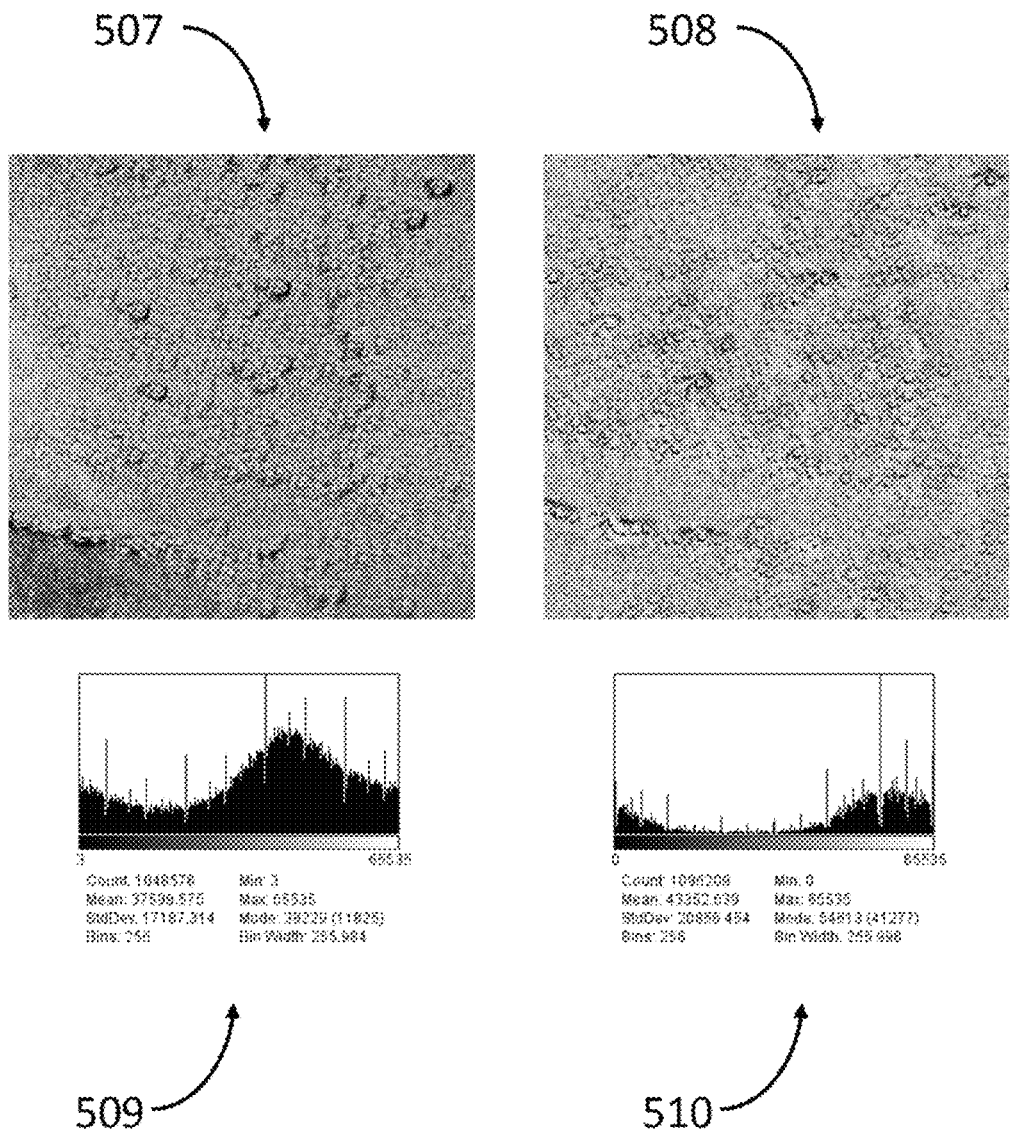
FIG. 5b illustrates phase images and respective histograms of microscopic beads imaged by fluorescence with a prior-art embodiment of FINCH and with a FINCH device of the type of embodiment in FIG. 4b.

Example illustrative results of the performance of the polarization-based phase shifting FINCH holographic method is shown in FIG. 5b. A sample of 100 nm diameter beads (sub resolution by standard optical methods) was imaged using a FINCH microscope system with birefringent lenses as the interferometric hologram-forming element, of a type similar to that reported in the above noted Siegel et al "High-magnification super-resolution FINCH microscopy using birefringent crystal lens interferometers". Two strategies for obtaining multiple phase-shifted holograms (interference patterns) were employed: the strategy of the present invention, with a quarter-wave plate and a micro-polarizer grid-masked camera for single shot acquisition as in FIG. 4b; and the general strategy of sequential phase shifted recordings using a variable waveplate of the conventional techniques (calibrated for a single wavelength) to shift the interference phase. The resulting complex phases of the polarization method according to embodiments were compared with the conventional variable waveplate method are shown in 507 and 508 respectively. Also shown are the image histograms of the phase values in 509 according to embodiments and the conventional phase values in 510. The phase patterns in 507 (embodiments of the present invention) appear quite spherical to the eye, with fewer aberrations than seen in 508, the conventional techniques. Additionally, the histograms of the complex hologram phases show excellent performance of the embodiments of the present invention. In the ideal case, the histogram of a complex hologram phase shown on a 0-65,535 scale should be centered (the mean pixel value should be) at approximately 32,767, with an equal distribution on the positive and negative slopes. Histogram 509 from an embodiment of the present invention is centered at 37,600, much closer to the ideal than histogram 510 from the techniques of U.S. Pat. Nos. 10,228,655, 10,289,070, 10,423,123, and 10,591,870 and patent application 20170185036, and "High-magnification super-resolution FINCH microscopy using birefringent crystal lens interferometers", which is centered at ~42,350. Since the raw holograms that were recorded with the embodiment of the present invention produced a complex hologram phase that was a better match to the expected phase value histogram, it is clear that the embodiment has solved the problems it was designed for; the applied phase shifts were improved in calibration accuracy and fidelity to the desired values.

Figure 5C:
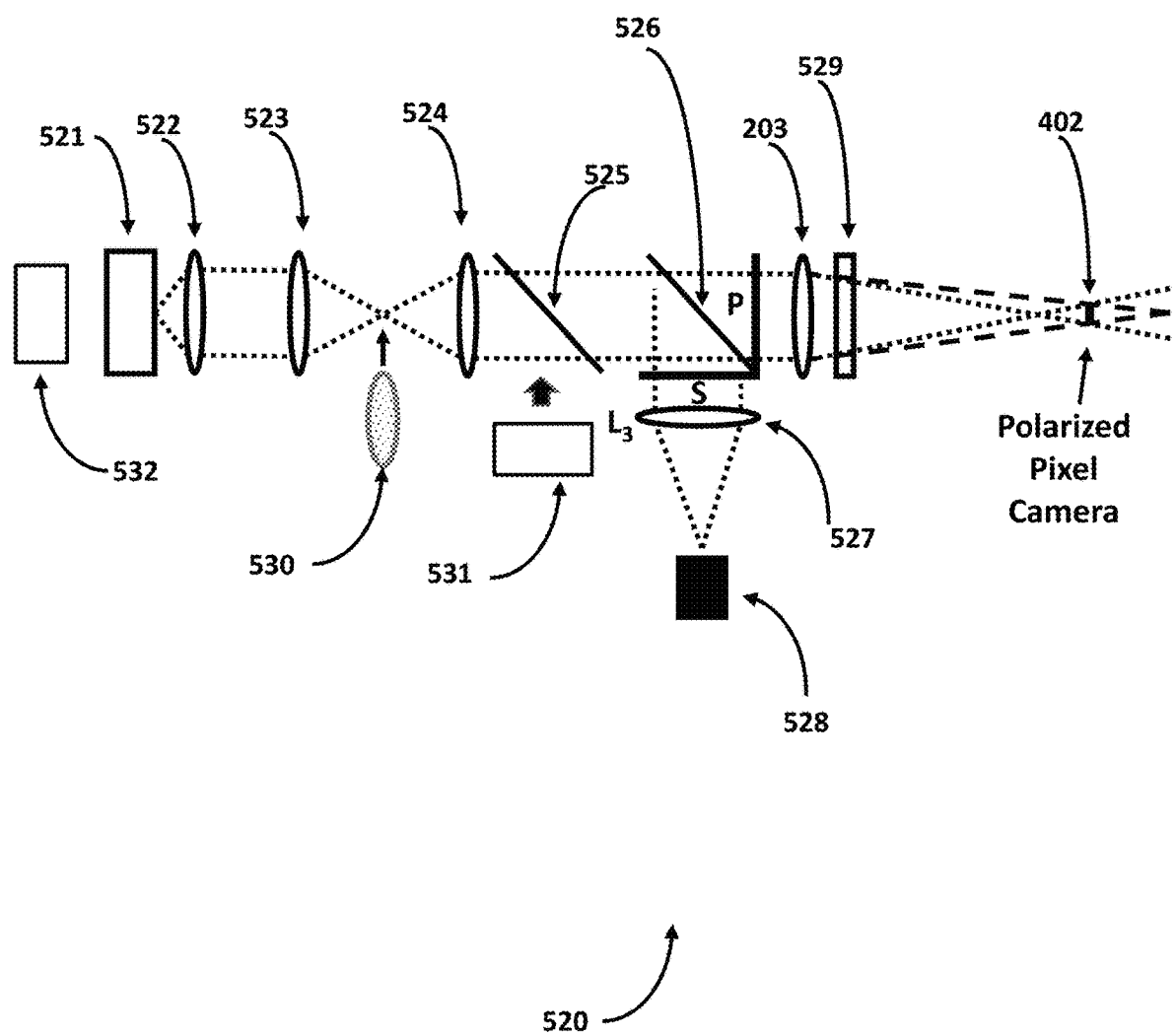
FIG. 5c illustrates an example embodiment of a microscope configured to use standard and FINCH imaging in non-confocal or confocal applications, with a polarized pixel camera to record multiple interspersed holograms in a single interference image record.

A microscope was constructed to incorporate the phase shifting method described herein into a hybrid microscope that can record widefield, confocal, FINCH and confocal FINCH images or holograms under either fluorescence excitation, reflected light, or transmitted light illumination. The microscope can also create any of these types of images from luminescence light. Briefly, referring to the microscope schematic 520 in FIG. 5c and omitting mirrors and other elements that do not contribute focal power or affect the FINCH holographic process, a microscope objective lens 522 is the first lens in the FINCH microscope that images a specimen 521. A 4 F relay consisting of lenses 523 and 524 is placed to transfer the image of the back pupil of the objective 522 onto a birefringent lens (BRL) assembly 203 that produces the differentially focused beams necessary to achieve FINCH interference. As in any modern microscope with infinity corrected optics, the space between lens 524 and the BRL assembly 203 is infinity space for insertion of standard microscope dichroic beam splitting filters 525 and any other optic such as emission filters and polarization optics. Prior to 203 is a linearly polarizing beam splitter (PBS) 526 that transmits light polarized midway between the BRL birefringent axes. The rejected polarization from the PBS 526 is directed to a standard microscope tube lens 527 and focused onto a standard camera 528 such as CCD or CMOS to capture a widefield or confocal image for the purpose of comparison to the FINCH or CINCH image. This comparison widefield or confocal image is not a strict requirement of FINCH imaging and is used here solely as a benchmark comparison so that an identical widefield or confocal image can be compared to the FINCH or CINCH image. Note that if the light emitted from the specimen 521 was polarized (i.e. if a fluorescent sample was illuminated with polarized light so that a fluorescence polarization technique is enabled), the PBS 526 would not be necessary at all and the comparison standard optical train 527, 528 could be omitted.

Returning to the FINCH optical path, positioned after the birefringent lens assembly 203 is an achromatic quarter-wave-plate (QWP) 529 with its slow axis aligned midway between the birefringence axes of the BRL. As noted above, the QWP 529 converts the orthogonally linearly polarized light beams that it receives into orthogonally circularly polarized light beams, still with differing focal lengths, that are caused to interfere at the micro-polarizer camera 402. Confocality of imaging is provided by a spinning Nipkow pinhole disk 530 that can be inserted into the optical path at the focal plane between 523 and 524. Fluorescence and reflectance illumination light is provided from illumination lamp 531, while transmitted illumination light is provided by illumination lamp 532.

To capture a widefield or confocal standard or FINCH image with the microscope described in 520, the operating procedure of the microscope is identical to that of a standard widefield or spinning disk confocal microscope. The sample is brought into focus, the exposure time is metered to maximize the signal-to-noise ratio while avoiding saturation, and a single exposure is captured. Following a single image capture, the recorded hologram is converted to a complex hologram as in Equation 1 and related discussion, and reconstructed by Fresnel Propagation as in Equation 2 either directly to the focal plane of the objective, or alternately into a calculated stack of reconstructed images representing a through-focus series of planes. The reconstructed focal plane image can be displayed live during image capture, if desired. The absolute value of the reconstructed image was used for further analysis. Deconvolution of the reconstructed image or image stack was performed using a custom FINCH PSF and a blind deconvolution with entropy regularization. Further description of microscope 520 is found in Siegel, Nisan, and Brooker, Gary, "Single shot holographic super-resolution microscopy", Optics Express Vol. 29(19), 15953-68 (2021), incorporated herein by reference in its entirety.

Figure 5D:
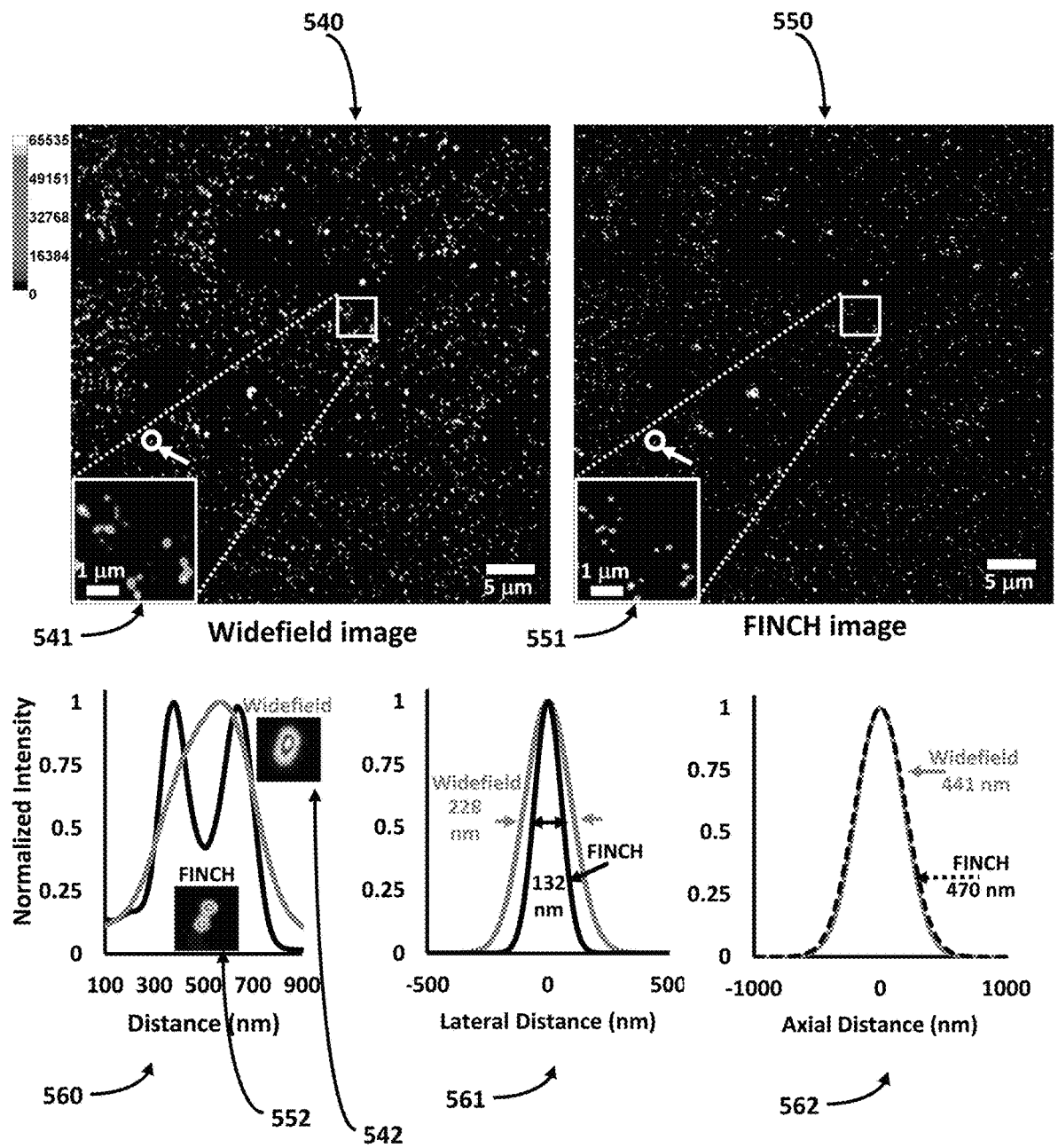
FIG. 5d illustrates fluorescent light standard and FINCH images of microscopic fluorescent beads recorded by an embodiment of the invention.

To demonstrate the capabilities of microscope 520, a sample of fluorescent beads of 110 nm diameter was imaged in the absence of the confocal disk. A 60× objective (1.49 NA Nikon CFI TIRF objective, used in standard imaging configuration) was used along with Cy3 excitation (555 nm) and emission (590±20 nm) channels. A single raw hologram image frame was recorded that contained four different quadrature phase factors of the hologram. These phase factors were abstracted into independent image arrays, with the blank pixels in each array filled in by nearest neighbor interpolation. A stack of 11 reconstructed images equally spaced from 0.5 microns above to 0.5 microns below the objective plane of focus was generated from the single shot hologram taken with the bead sample in focus as described above. The reconstructed image stack was then deconvolved. For comparison to the FINCH results, a through-focus stack of 17 standard widefield images, separated by 100 nm in axial distance by physically moving the objective, was also captured in the same imaging session by the widefield camera and was similarly deconvolved. Prior to deconvolution, the widefield image of the beads was resampled by a factor of two, using nearest neighbor interpolation, in order to assure that the small pixel size and nearest neighbor interpolation of the FINCH images was not responsible for the improved resolution therein. The object pixel size of the images is 33.8 nm for the widefield, and 25.5 nm for the FINCH or CINCH images, much smaller than the widefield and FINCH Nyquist limits of ~100 and ~50 nm for this optical system. The resultant deconvolved images, both widefield 540 and single-shot FINCH 550 for the same area of the image, are shown in FIG. 5d, each of which also features a magnified section 541, 551 in an inset to illustrate the resolution improvement by FINCH. The FINCH image clearly demonstrates better resolution than the widefield, with several features that are not resolved in the widefield image, now resolved into individual beads in the FINCH image as seen clearly in the insets 541, 551 and as also pointed out by the arrows and circles in FIG. 540, 550 and line profiles and expanded images 542, 552 of one of those features in plot 560. Plot 560 is a plot showing a normalized intensity profile taken through the feature in the images 540, 550 pointed out by an arrow and circle. This feature appears as a single object in the widefield image 540, 542 with a corresponding intensity profile containing a single peak of approximately 400 nm width. The Rayleigh limit for resolution of two points at this wavelength (590 nm) is approximately 242 nm for a 1.49 NA TIRF objective. Since the objective was not used in a TIRF instrument configuration, it is unlikely that the full NA was utilized; if an NA of 1.4 is assumed, the Rayleigh limit is 257 nm. To satisfy the Rayleigh criterion for two-point resolution, the normalized intensity profile through the peaks of the two points should display an intensity minimum of 0.74 (or less) between the peaks. It would thus be difficult in a widefield image to discern two beads, each of which produce an image approximately 200 nm wide, separated by about 250 nm. However, the same feature in the FINCH image 550, 552 is revealed to be a very well-resolved pair of beads separated by about 255 nm in the FINCH image. The normalized intensity profile of the pair of beads in the FINCH image shows an intensity minimum of 0.5 between the peaks, significantly better than the Rayleigh criterion of 0.74. Thus the FINCH image here demonstrates that FINCH does not simply narrow the PSF of isolated features but enables the discrimination of closely spaced fine features that widefield imaging cannot resolve.

A set of 11 randomly selected beads was selected for further analysis of their respective widths as a measure of the full-width half-max (FWHM) of the imaging system, a characteristic often used as a measure of the point-spread function (PSF) of an imaging system. The resulting average bead widths, shown in 561 were 132 nm±23 nm for the FINCH image, and 228±21 nm for the widefield image.

In order to make a practical measurement of the PSF width of Birefringent Lens FINCH in the axial direction, a stack of through focus images of the 110 nm beads was collected by physically translating the sample through the objective focus in 100 nm steps. In this way a measurement could be made of the influence of out-of-focus planes on the in-focus plane. Each plane imaged in the z-stack was reconstructed to the focal plane of the objective, and these reconstructed images of the same beads used for the lateral PSF measurements were placed in an image stack in a processing software, deconvolved, and an axial PSF measurement was made. This measurement served to describe the performance of FINCH for objects as they move through the focal plane of the objective. The through-focus stack of the widefield images was measured in the same way. The results, plotted in 562, show that FINCH has an axial FWHM of 470±25 nm, (adjusted to 414±22 nm at 520 nm emission) nearly equal to the widefield value of 441±23 nm (389±20 nm at 520 nm emission). After deconvolution, this adjusted axial PSF for FINCH fits in the range reported for other super-resolution methods, especially when taking into account the fact that the FINCH measurements were widefield instead of confocal, which would be expected to increase the size of the axial PSF of FINCH in comparison to other super-resolution methods, which are usually confocal.

Figure 5E:
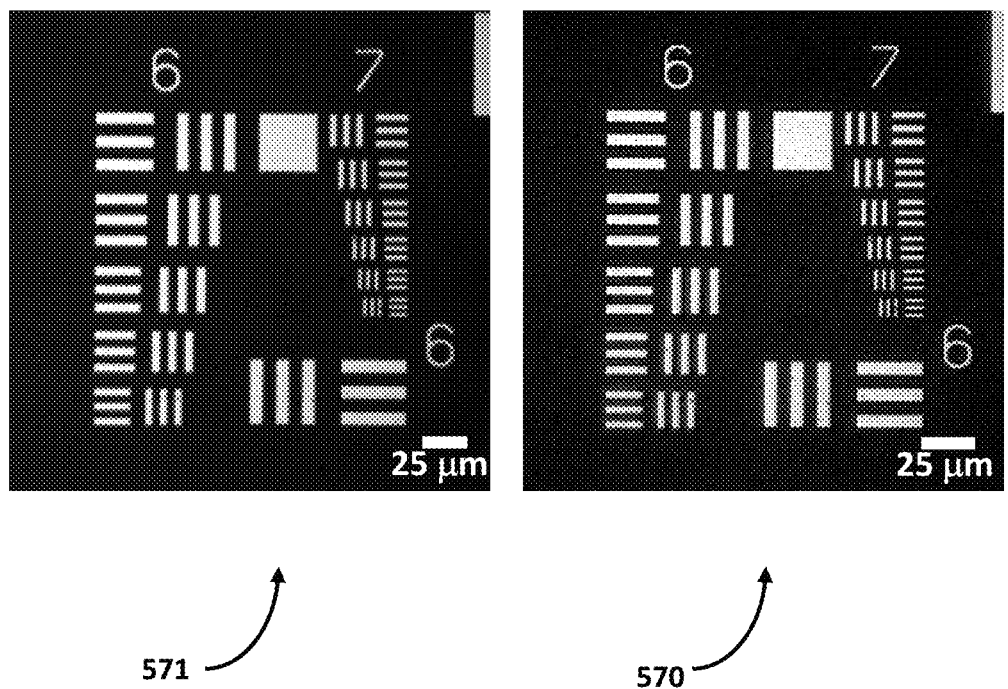
FIG. 5e illustrates a FINCH image recorded with an embodiment of the invention and a standard image of the same sample, both recorded under reflected light illumination.

This new FINCH development has considerable flexibility, producing super resolved images with any objective magnification or wavelength and imaging mode. To further demonstrate that the high image quality of FINCH is not limited to fluorescence imaging with high NA objectives, a reflective USAF pattern was imaged in the CINCHSCOPE microscope with 465 nm reflected light, using a low magnification, low NA objective. The fluorescence dichroic 526 and emission filter was replaced with a 50% plate beam splitter. Light of 465 nm wavelength from the illumination lamp 531 was directed onto the sample with a 10× 0.3 NA objective in the place of 522 and the reflected light was used to a form standard and FINCH images as described herein. The results, without deconvolution, are shown in FIG. 5e. Note that the FINCH image 570 is of high quality, with sharp edges of the features and contrast as high as the widefield image 571, and with no degradation due to speckle as might be expected from holographic reflectance imaging. In fact, careful inspection reveals that the defects in the reflective pattern are imaged more clearly in the FINCH image than in the widefield image.

Figure 6:
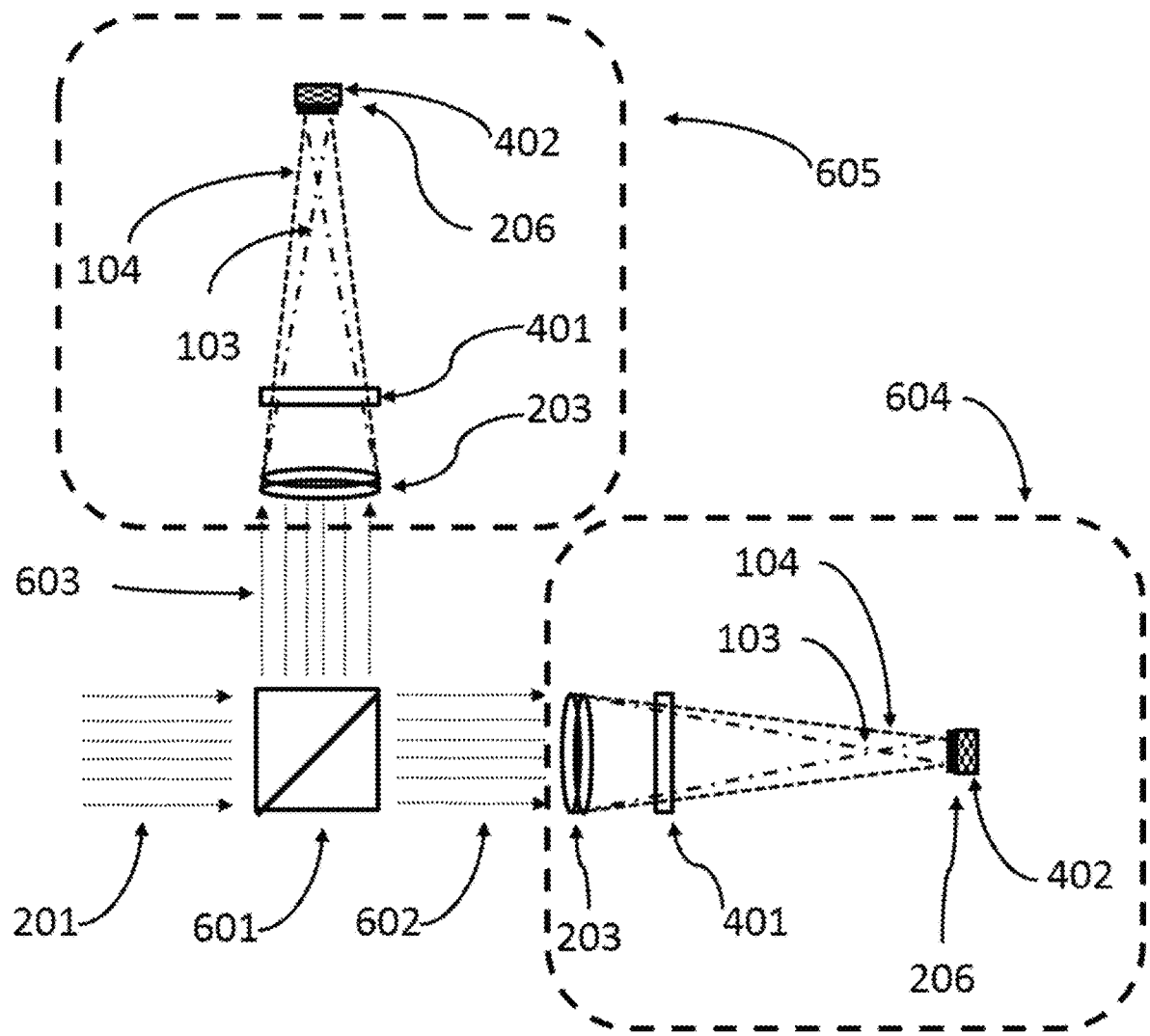
FIG. 6 illustrates an example embodiment with two identical optical trains of the type of the embodiment in FIG. 4b, each receiving a single linear polarization from a linear polarizer operating on the received light from the object.

In another embodiment shown in FIG. 6, the input polarizer mentioned in the preceding embodiment is a polarizing beam splitter 601, which receives the input light 201. Each of the two linearly orthogonally polarized beams 602, 603 from this polarizing beamsplitter is then directed toward one of two identical FINCH systems 604, 605 of the general type in the preceding embodiment (though lacking discrete input polarizer as that function is shared for both 604, 605 by 601), allowing a greater efficiency of light collection. Each of the FINCH systems 604, 605 contains birefringent lens optics 203, broadband quarter-wave plate 401, and micro-polarizer grid camera 402, and forms co-propagating linearly orthogonally polarized beams 103, 104 that reach an interference plane 206.

The present inventors have observed that a system in which FINCH is enhanced with one of the embodiments of FIG. 4a or 4b may often improve the recorded hologram quality and/or performance of current FINCH systems. For example, current FINCH systems require a high level of precision in a real-world system such as a microscope that must be sensitive to multiple wavelengths of light. In such cases, the variable waveplate of conventional methods of phase shifting may require precise calibration for each wavelength. Furthermore, in systems in which the sample light is broadband, this calibration can only be fully corrected for a single wavelength, leaving the other wavelengths in the band open to be shifted by an imprecise amount. This may cause degradation in the raw holograms that form, as incorrect phase shift of any part of the raw hologram results in incorrect calculation of the phase and intensity of the object and therefore reduced image quality in the calculated image. Additionally, even in the absence of calibration error, multiple colors (wavelength bands) of holograms cannot be recorded with accurate phase shift by conventional methods, as only one wavelength band can match the calibration of a variable waveplate at one time. The embodiments of the present invention allows multiple colors or wavelength bands to pass through an identical optical train, each color being phase shifted accurately, with color filters or a Bayer pattern camera then sufficient to record multiple color holograms Moreover, the single shot embodiments of the enhanced FINCH may improve upon the current FINCH systems by, for example, reducing the length of illumination of potentially delicate samples, by allowing for increased time resolution, reducing possibility of object or background changes between sequential hologram recording, particularly in the case of living or moving objects, eliminating the need for calibration of phase shifting devices for multiple wavelengths. Moreover, the single shot embodiments of the invention may, in the case of broadband light, reduce or eliminate the impact of the inability of some serial hologram acquisition techniques to perfectly shift the phase only for a single wavelength of the light, while other wavelengths experience more or less than the desired phase shift.

In another embodiment of the invention, the input polarizer mentioned in the first embodiment is a polarizing beam splitter. Each beam from this polarizing beamsplitter is then directed toward one of two identical FINCH systems of the general type in the preceding embodiment, allowing a greater efficiency of light collection. The interference patterns collected at the termini of the identical FINCH systems are then correlated with each other in a coincidence imaging image recording, to enhance the signal to noise ratio in the image recording.

Alternatively, in another embodiment of the invention, the input polarizer mentioned in the first embodiment is a polarizing beam splitter. Each beam from this polarizing beamsplitter is then directed toward one of two almost identical FINCH systems of the general type in the preceding embodiment, each for example detecting a different bandwidth or wavelength of light by a variety of means.

When the interference patterns are recorded in the single shot method listed above, it is significant that for n micropolarizer orientations, each phase shifted interference pattern only contains approximately 1/n of the pixels it would contain if all the micropolarizers were of a single orientation. The multiple phase shifted interference patterns, then, are actually sparse representations of the full interference patterns. The significance of this is that in addition to the other benefits of single shot recording, the sparse data sets representing the interference patterns may optionally be analyzed using compressive sensing approaches, which are powerful computational approaches that perform best on sparse data sets. Compressive sensing approaches have been applied to holographic imaging reconstruction before but have not been successful at reconstructing complicated objects. The sparsity of the multiplexed interference recordings, as well as the fact that they are from different phase "viewpoints", enable the application of compressive sensing approaches to the image reconstruction in ways that are not available to sequentially recorded phase shifted interference patterns.

Accordingly, in another embodiment, the incoming object light is linearly polarized at an input polarizer and passed through the birefringent lens optics. Then the light is passed through a broadband quarter-wave plate that has its slow axis aligned ±45 degrees to the ordinary and extraordinary axes of the birefringent lens. Multiple phase shifted interference patterns are then simultaneously collected as sparse representations of full interference patterns in a single shot, by using a detector with an array of differentially aligned micropolarizers with at least two polarization orientations overlaid on its pixels. These phase shifted interference patterns are each then reconstructed into the full interference patterns using standard or compressive sensing computational approaches. The full interference patterns are then used to construct the complex hologram and reconstructed images.

In another embodiment, the incoming object light is linearly polarized at an input polarizer and passed through the birefringent lens optics. Then the light is passed through a broadband quarter-wave plate with that has its slow axis aligned ±45 degrees to the ordinary and extraordinary axes of the birefringent lens. Multiple phase shifted interference patterns are then simultaneously collected as sparse representations of full interference patterns in a single shot, by using a detector with an array of differentially aligned micropolarizers with at least two polarization orientations overlaid on its pixels. These phase-shifted interference patterns are then reconstructed directly into images (without intermediately being made into complex holograms) using joint iterative computational approaches including compressive sensing and forward convolutional approaches.

Alternatively, the potential reduction in spatial resolution by multiplexing the phase recordings can be overcome by reducing the size and increasing the number of multiplexed pixels. In this way the resultant complex hologram pixels can be the same size as non-phase multiplexed methods.

Figure 7:
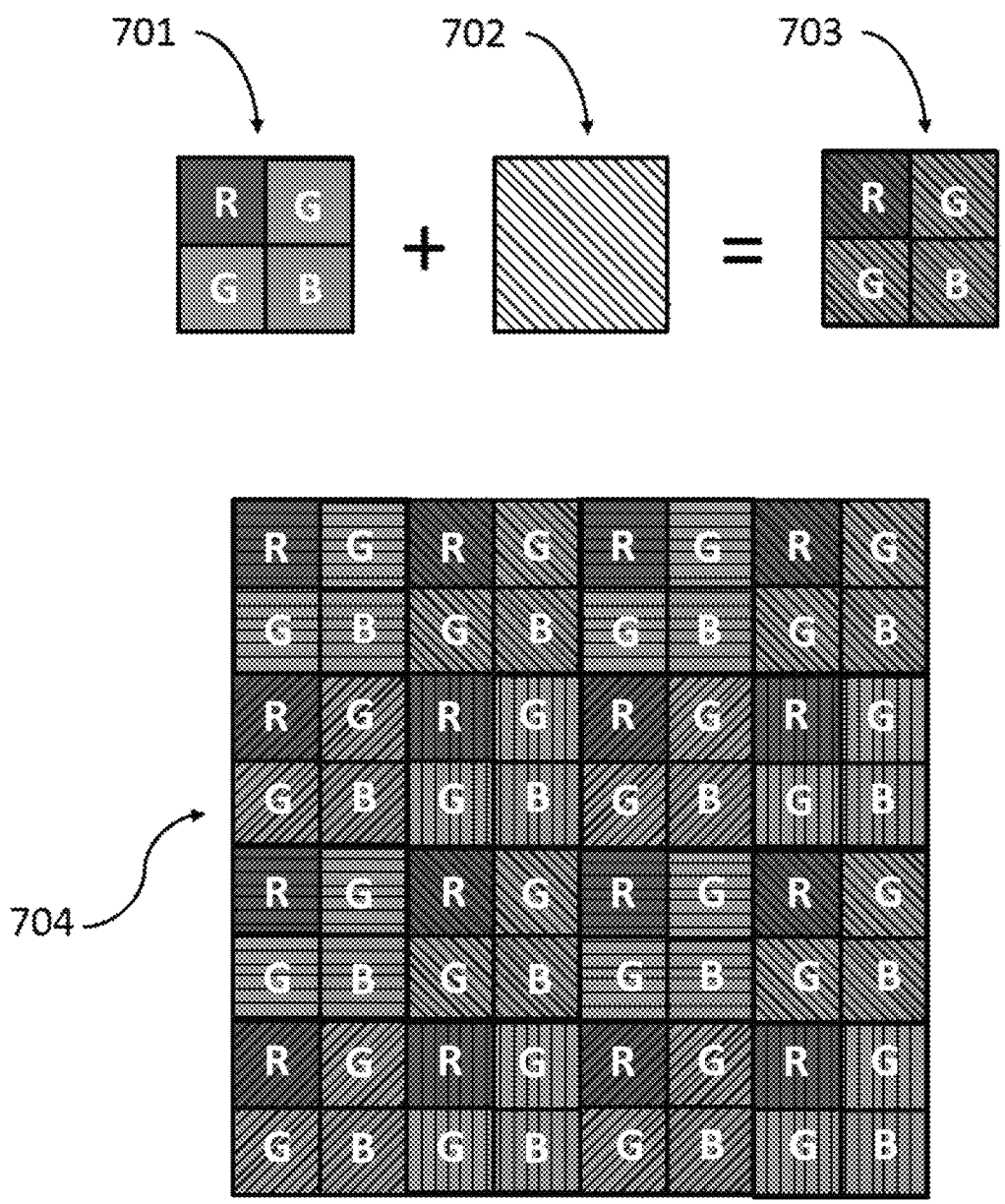
FIG. 7 illustrates a pixelated imaging sensor, divided into sampled regions for both polarization of received light and wavelength of received light.

The use of patterned micropolarizer masks is not limited to monochrome image recording, shown in FIG. 7. Color cameras have a plurality of color-selective pixels arranged in patterns such for example as the Bayer pattern; each single color pixel (RGB for example) in the color image is composed of a group of color sensitive pixels 701 (one R, one B, two G, for example). It is therefore possible to align a micropolarizer mask so that each micropolarizer 702 is registered to a group 701 of individual camera pixels that represents a single color pixel in the final image, resulting in 703 a color pixel that accepts only one polarization and therefore only one phase factor of the interference in embodiments of the present invention. See FIG. 7 for an exemplary illustration of this, including 704 an array of color pixels under an array of micropolarizers. This Bayer pattern implementation of FINCH works quite well since FINCH only requires 3 phase shifted holograms for the precise elimination of bias and the twin image to create a 3D representation of the subject. FIG. 7 shows 4 different polarization orientations, however the polarizers could be arranged with only three orientations.

Accordingly, in another embodiment, the incoming broadband object light is linearly polarized at an input polarizer and passed through the birefringent lens optics. Then the light is passed through a broadband quarter-wave plate with that has its slow axis aligned ±45 degrees to the ordinary and extraordinary axes of the birefringent lens. Multiple phase shifted multi-color interference patterns are then simultaneously collected in a single shot, by using a detector with an array of differentially aligned micropolarizers with at least two polarization orientations overlaid on an array of multi-color recording pixels.

It may be desired to record multiple colors of holograms in a single exposure without using a bayer-patterned or similar color image sensor. An effective method to accomplish this goal is to filter the light that has passed the quarter waveplate of the previous embodiment in a sequence of color filters such as dichroic mirrors, and direct the filtered colors of the light to different monochrome image sensors.

Accordingly, in another embodiment, the incoming broadband object light is linearly polarized at an input polarizer and passed through the birefringent lens optics. Then the light is passed through a broadband quarter-wave plate with that has its slow axis aligned ±45 degrees to the ordinary and extraordinary axes of the birefringent lens. The light is then passed through a plurality of color filters and directed to a corresponding plurality of monochrome image detectors arranged in any convenient arrangement, including by subdividing a single monochrome image sensor into discrete non-overlapping regions. Multiple colors of phase shifted interference patterns are then collected simultaneously, one color on each of the plurality of monochrome image detectors.

The present inventors, having practiced in and in one case having originally invented FINCH, propose the above improvements to the FINCH system generally and in particular to the birefringent lens equipped FINCH system. These proposed improvements improve upon and in many instances simplify the FINCH systems proposed previously. It should be noted, however, that although the embodiments of the present invention are discussed in relation to FINCH, the techniques may be applicable to other self-interference interferometric methods including but not limited to those practiced in other types of holography. Moreover, while embodiments of the present invention are discussed in relation to visible light for simplicity, one skilled in the art will recognize that the teachings herein are applicable to all types of electromagnetic radiation.

The following references are incorporated by reference in their respective entireties

[Reference 1] Rosen, J. and Brooker, G. "Digital spatially incoherent Fresnel holography," Optics Letters, 32, pp 912-914, 2007; [Reference 2] Rosen, J. and Brooker, G. "Fluorescence incoherent color holography," Optics Express, Vol 15, pp 2244-2250, 2007; [Reference 3] Rosen, J. and Brooker, G., "Non-Scanning Motionless Fluorescence Three-Dimensional Holographic Microscopy", Nature Photonics 2, 190-195 (2008); [Reference 4] Brooker, Gary, Siegel, Nisan, Wang, Victor, and Rosen, Joseph, "Optimal resolution in Fresnel incoherent correlation holographic fluorescence microscopy", Optics Express, Vol 19, No. 6, pp 5047-5062 (2011); [Reference 5] Rosen, Joseph, Siegel, Nisan and Brooker, Gary, "Theoretical and experimental demonstration of resolution beyond the Rayleigh limit by FINCH fluorescence microscopic imaging", Optics Express, Vol 19, 26249-26268 (2011); [Reference 6] Katz, Barak, Rosen, Joseph, Kelner, Roy and Brooker, Gary, "Enhanced resolution and throughput of Fresnel incoherent correlation holography (FINCH) using dual diffractive lenses on a spatial light modulator (SLM)", Optics Express, Vol 20, pp. 9109-9121 (2012); [Reference 7] Siegel, Nisan, Rosen, Joseph and Brooker, Gary, "Reconstruction of objects above and below the objective focal plane with dimensional fidelity by FINCH fluorescence microscopy", Optics Express Vol. 20, pp 19822-19835 (2012); [Reference 8] Rosen, Joseph, Siegel, Nisan and Brooker, Gary, "Theoretical and experimental demonstration of resolution beyond the Rayleigh limit by FINCH fluorescence microscopic imaging", Optics Express, Vol 19, 26249-26268 (2011); [Reference 9] Siegel, Nisan, Rosen, Joseph and Brooker, Gary, "FINCH holograms reconstructed using a Hamming-window impulse response function in Fresnel propagation yields high quality image stacks", Opt Lett. October 1; 38(19): 3922-5. (2013); [Reference 10] Brooker G, Siegel N, Rosen J, Hashimoto N, Kurihara M, Tanabe A., "In-line FINCH super resolution digital holographic fluorescence microscopy using a high efficiency transmission liquid crystal GRIN lens", Opt Lett. December 15; 38(24): 5264-7 (2013); [Reference 11] Siegel, Nisan and Brooker, Gary, "Improved axial resolution of FINCH fluorescence microscopy when combined with spinning disk confocal microscopy," Optics Express Vol. 22, pp 22298-22307 (2014); [Reference 12] Siegel N, Storrie B, Bruce M, Brooker G., "CINCH (Confocal Incoherent Correlation Holography) Super Resolution Fluorescence Microscopy Based upon FINCH (Fresnel Incoherent Correlation Holography)", Proc. SPIE. 2015 Mar. 11; 9336; [Reference 13] Siegel N, Lupahin V, Storrie B, Brooker G., "High-magnification super-resolution FINCH microscopy using birefringent crystal lens interferometers", Nature Photonics 10 (12) 802-802 (2016); [Reference 14] U.S. Pat. No. 8,179,578: "System, Apparatus and Method for Extracting Three-Dimensional Information of an Object from Received Electromagnetic Radiation", Issued May 15, 2012; [Reference 15] Nobukawa T, Muroi T, Katano Y, Kinoshita N, Ishii N, "Single-shot phase-shifting incoherent digital holography with multiplexed checkerboard phase gratings. Optics Letters 43(8)1698 (2018); [Reference 16] Choi K, Yim J, Min S-W, "Achromatic phase shifting self-interference incoherent digital holography using linear polarizer and geometric phase lens. Optics Express 26(13) 16212 (2018)"; [Reference 17] Awatsuji Y, Fujii A, Kubota T, Matoba 0, "Parallel three-step phase-shifting digital holography", Applied Optics 45(13) 2995-3002 (2006); [Reference 18] Millerd J, Brock N, Hayes J, North-Morris M, Novak M, Wyant J, "Pixelated phase-mask dynamic interferometer", Proceedings of SPIE Vol 5531 Issue 520 p 304-314 (2004) DOI 10.1117/12.560807; [Reference 19] U.S. Pat. No. 8,351,048, "Linear-Carrier Phase-Mask Interferometer", issued Jan. 8, 2013; [Reference 20] U.S. Pat. No. 6,304,330; [Reference 21] U.S. Pat. No. 7,230,717; [Reference 22] U.S. Pat. No. 7,777,895; [Reference 23] Siegel, Nisan, and Brooker, Gary, "Single shot holographic super-resolution microscopy", Optics Express Vol. 29(19), 15953-68 (2021); and [Reference 24] Brooker, Gary and Siegel, Nisan, "Historical development of FINCH from the beginning to single-shot 3D confocal imaging beyond optical resolution" Applied Optics Vol. 61(5), B121-B131 (2021).

One or more computers may control and/or associated with the imaging device described herein. For example, the computer 108 shown in FIG. 1a may run one or more processes to collect recorded interference patterns and generate holograms and/or reconstructed images as described in this application. It will be understood that a computer (a "computing device," "computer system," or "computing system") such as 108 includes one or more of the following: one or more processors; one or more memory devices; one or more network interface devices; one or more display interfaces; and one or more user input adapters. Additionally, the computing device may be connected to or includes a display device. These elements are hardware devices (for example, electronic circuits or combinations of circuits) that are configured to perform various different functions for the computing device. Whenever it is described in this document that a software module or software process performs any action, the action is in actuality performed by underlying hardware elements according to the instructions that comprise the software module.

According to one example embodiment, an imaging device, comprises: a means for receiving electromagnetic radiation from an object; a means for imposing a linear polarization on the received electromagnetic radiation; a means to produce two linearly orthogonally polarized beams from the received electromagnetic radiation, each beam bearing information about the location of the object, and each beam having a distinct phase curvature; a means to convert the linearly orthogonally polarized beams into circularly orthogonally polarized beams without changing the phase curvatures of the beams; a means to cause mutual interference of the circularly orthogonally polarized beams with controlled relative phase factors; a means to record the interference patterns created by the mutual interference, and a means to produce holograms and reconstructed images of the object from the recorded interference patterns.

The device of the previous paragraph, wherein the means for imposing a linear polarization is a polarizing beam splitter.

The device of the previous paragraph, wherein the transmitted and reflected beams from the polarizing beam splitter are both directed toward identical systems comprises: a means to produce two linearly orthogonally polarized beams from the received electromagnetic radiation, each beam bearing information about the location of the object, and each beam having a distinct phase curvature; a means to convert the linearly orthogonally polarized beams into circularly orthogonally polarized beams without changing the phase curvatures of the beams; a means to cause mutual interference of the circularly orthogonally polarized beams with controlled relative phase factors; a means to record the interference patterns caused by the mutual interference, such that two sets of phase shifted interference patterns are recorded to increase the image collection efficiency of the optical system; and a means to produce holograms and reconstructed images of the object from the recorded interference patterns.

The device of the previous paragraph, wherein the two sets of phase shifted holograms are further processed in a coincidence imaging approach to increase the signal-to-noise ratio of hologram recording.

The device of two paragraphs above, wherein the means to cause mutual interference are arrays of small polarizing elements, with each element possessing one of a set of n different polarization orientations, wherein each element is registered to a specific location in the planes of the means to record the interference patterns, and wherein each location in the planes of the recording means simultaneously records multiple discrete colors.

The device of three paragraphs above, wherein the means to cause mutual interference are linear polarizers.

The device of four paragraphs above, wherein the means to cause mutual interference is an array of polarizing elements, with each element possessing one of a set of n different polarization orientations, wherein each element is registered to a specific location in the planes of the means to record the interference patterns.

The device of the paragraph above, wherein all the interferences that are necessary to produce a complex-valued hologram of the object are captured in a single exposure on the recording means.

The device of the paragraph above, wherein all the interferences that are necessary to produce complex-valued holograms of the object are captured in a single exposure on each of the recording means.

The device of seven paragraphs above, wherein the images produced are super-resolved images.

The device of nine paragraphs above, wherein the means to cause mutual interference is a linear polarizer.

The device of ten paragraphs above, wherein the means to cause mutual interference is an array of small polarizing elements, with each element possessing one of a set of n different polarization orientations, wherein each element is registered to a specific location in the plane of the means to record the interference patterns.

The device of eleven paragraphs above, wherein the reconstructed images produced are super-resolved images.

The device of twelve paragraphs above, wherein the means to cause mutual interference is an array of small polarizing elements, with each element possessing one of a set of n different polarization orientations, wherein each element is registered to a specific location in the plane of the means to record the interference patterns, and wherein each location in the plane of the recording means simultaneously records multiple discrete colors.

An imaging device of thirteen paragraphs above, wherein the device does not require any mechanical or electronic changes to the electromagnetic radiation collection, transformation, or recording means during the image capture in order to create the hologram.

The device of fourteen paragraphs above, wherein the means for imposing a linear polarization on the received electromagnetic radiation is the use of linearly polarized illumination light.

The device of fifteen paragraphs above, wherein the received electromagnetic radiation is light in the range of ultraviolet to infrared.

The device of sixteen paragraphs above, wherein the received electromagnetic radiation originates from a bioluminescent or chemiluminescent source.

The device of seventeen paragraphs above, wherein the received electromagnetic radiation originates from a fluorescent source.

The device of eighteen paragraphs above, wherein the received electromagnetic radiation is reflected radiation from the object.

The device of nineteen paragraphs above, wherein the received electromagnetic radiation is coherent.

The device of twenty paragraphs above, wherein the received electromagnetic radiation is incoherent.

The device of twenty one paragraphs above, wherein the received electromagnetic radiation consists of X-rays.

Another example embodiments provides an imaging device configured to produce super-resolved images of an object. The device comprises: a means for receiving electromagnetic radiation from an object; a means for imposing a linear polarization on the received electromagnetic radiation; a birefringent lens configured to produce two linearly orthogonally polarized beams from the linearly polarized electromagnetic radiation, each beam bearing information about the location of the object, and each beam having a distinct phase curvature; a quarter-wave plate configured to convert the linearly orthogonally polarized beams into circularly orthogonally polarized beams without changing the phase curvatures of the beams; an image recording device configured to record, in a single exposure, a plurality of phase shifted interference patterns formed by the interference of the circularly orthogonally polarized beams, wherein the image recording device includes an array of polarizing elements, with each polarizing element possessing one of a set of n different polarization orientations, wherein each polarizing element is registered to a specific location in the plane of the means to record the interference patterns, and wherein each polarizing element causes the interference of the two circularly orthogonally polarized beams; and an image computation assembly configured to produce super-resolved reconstructed images of the object from the plurality of phase shifted interference patterns recorded by the image recording device.

Another example embodiment provides a method to record interference patterns. The method includes: receiving electromagnetic radiation from an object; imposing a linear polarization on at least one portion of the received electromagnetic radiation; producing two co-propagating linearly orthogonally polarized beams from each of the linearly polarized portions of the received electromagnetic radiation, each beam bearing information about the location of the object, and each beam having a distinct phase curvature; converting each pair of linearly orthogonally polarized beams into a pair of circularly orthogonally polarized beams without changing their phase curvatures, causing mutual interference between each pair of the circularly orthogonally polarized beams with controlled relative phase factors; recording the interference patterns by at least one imaging device; and producing holograms and reconstructed images of the object from the recorded interference patterns.

The method according to the immediately preceding paragraph, wherein the recording includes recording only a single phase factor of the interference patterns in any given recording.

The method according to the paragraph above the immediately preceding paragraph, wherein the recording includes recording multiple phase factors of the interference patterns simultaneously.

The method according to the paragraph three paragraphs above, wherein the produced images are super-resolved images.

The method according to the paragraph four paragraphs above, wherein the causing mutual interference of the pairs of circularly orthogonally polarized beams is accomplished by directing each pair of circularly orthogonally polarized beams through an array of polarizing elements of a plurality of different polarization orientations, wherein each of the polarizing elements is registered to a specific location in the recording plane of the recording device that records the interference produced from that pair of circularly orthogonally polarized beams.

The method according to the immediately preceding paragraph, wherein each specific location in the recording plane of the recording device can record multiple discrete colors.

The method according to the paragraph six paragraphs above, wherein said producing holograms and images includes processing a plurality of sets of interference pattern recordings originating from different linearly polarized portions of the received electromagnetic radiation together in a coincidence imaging algorithm to increase signal to noise ratio in the recording.

The method according to the paragraph seven paragraphs above wherein no mechanical or electronic changes to the light collection, transformation, or recording devices are necessary during image capture to create the hologram.

Another example embodiment provides a method to determine information about an object. The method comprises: receiving electromagnetic radiation from an object; imposing a linear polarization on at least one portion of the received electromagnetic radiation; producing two co-propagating linearly orthogonally polarized beams from each of the linearly polarized portions of the received electromagnetic radiation, each beam bearing information about the location of the object, and each beam having a distinct phase curvature; converting each pair of linearly orthogonally polarized beams into a pair of circularly orthogonally polarized beams without changing their phase curvatures; directing each pair of circularly orthogonally polarized beams through an array of polarizing elements of a plurality of different polarization orientations in order to cause mutual interference between the circularly orthogonally polarized beams with controlled relative phase factors, wherein each polarizing element in the array is registered to a specific location in the recording plane of a recording device; recording the interference patterns by at least one imaging device; and computationally operating on the recorded interference patterns to determine information about the object.

The method according to the immediately preceding paragraph, wherein the computationally operating includes performing compressive sensing calculations.

The method according to the paragraph two paragraphs above, wherein the computationally operating includes processing multiple said recorded interference patterns together to determine information about the object.

Another example embodiment provides a method to determine super-resolved image information about an object. The method comprises: receiving electromagnetic radiation from an object; imposing a linear polarization on at least one portion of the received electromagnetic radiation; producing two co-propagating linearly orthogonally polarized beams from each of the linearly polarized portions of the received electromagnetic radiation by passing said radiation through a birefringent lens, each beam bearing information about the location of the object, and each beam having a distinct phase curvature; converting each pair of linearly orthogonally polarized beams into a pair of circularly orthogonally polarized beams, by passing the linearly orthogonally polarized beams through a quarter-wave plate, without changing their phase curvatures; directing each pair of circularly orthogonally polarized beams through an array of polarizing elements of a plurality of different polarization orientations in order to cause mutual interference between the circularly orthogonally polarized beams with controlled relative phase factors, wherein each polarizing element in the array is registered to a specific location in the recording plane of a recording device; recording said plurality of interference patterns by at least one imaging device in a single imaging exposure; and computationally operating on the recorded interference patterns to determine super-resolved reconstructed image information about the object.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. An imaging device configured to produce super-resolved images of an object, said device comprising:
    a means for receiving electromagnetic radiation from an object;
    a means for imposing a linear polarization on at least one portion of the received electromagnetic radiation;
    a birefringent lens assembly for producing a pair of two individual co-propagating linearly orthogonally polarized beams from each of the at least one linearly polarized portions of the received electromagnetic radiation, each individual co-propagating linearly orthogonally polarized beam bearing information about the shape and location of the object, and each individual co-propagating linearly orthogonally polarized beam having a distinct phase curvature from the other individual beam of the pair;
    a wideband quarter waveplate for converting each pair of linearly orthogonally polarized beams into a pair of circularly orthogonally polarized beams without requiring wavelength calibration or otherwise changing their phase curvatures;
    one of a linear polarizer or an array of differentially aligned micropolarizers for causing mutual interference between each individual of each pair of the circularly orthogonally polarized beams with the other individual of said pair, with controlled relative constant phase factors differing between the individuals;
    means for recording at least one image of each the interference patterns by at least one imaging device; and
    a computational means for producing holograms and reconstructed images of the object from the recorded images of the interference patterns.

2. The imaging device of claim 1, wherein the received electromagnetic radiation is light in the range of ultraviolet to infrared.

3. The imaging device of claim 1, wherein the means for imposing a linear polarization is a polarizing beam splitter that produces two differently linearly polarized portions of the electromagnetic radiation.

4. The imaging device of claim 3, wherein:
    each of the two polarized beams exiting the polarizing beam splitter is used as a said portion of the received electromagnetic radiation,
    and wherein two pairs of orthogonally circularly polarized beams are produced, and wherein two imaging devices each produce at least one interference pattern from one or the other of the two portions.

5. The imaging device of claim 1, wherein the means for imposing a linear polarization on the received electromagnetic radiation is the use of linearly polarized illumination.

6. The imaging device of claim 1, wherein the one of a linear polarizer or an array of differentially aligned micropolarizers to cause mutual interference is at least one linear polarizer and wherein said imaging device records a single phase factor of each interference pattern in a single exposure.

7. The imaging device of claim 1, wherein:
the one of a linear polarizer or an array of differentially aligned micropolarizers to cause mutual interference is at least one array of small polarizing elements, with each element possessing one of a set of n different polarization orientations,
wherein each element is registered to a specific location in the plane of the means to record the interference patterns, and
wherein said imaging device records n different constant phase factors of each interference pattern in a single exposure.

8. The imaging device of claim 1, wherein:
the one of a linear polarizer or an array of differentially aligned micropolarizers to cause mutual interference is at least one array of small polarizing elements, with each element possessing one of a set of n different polarization orientations,
wherein each element is registered to a specific location in the plane of the means to record the interference patterns, and
wherein each location in the plane of the recording means simultaneously records multiple discrete colors, and
wherein said imaging device records n different constant phase factors of each interference pattern of each discrete color in a single exposure.

9. A method to produce super-resolved images of an object, including:
receiving electromagnetic radiation from an object;
imposing a linear polarization on at least one portion of the received electromagnetic radiation;
producing, using a birefringent lens assembly, a pair of two individual co-propagating linearly orthogonally polarized beams from each of the at least one linearly polarized portions of the received electromagnetic radiation, each individual co-propagating linearly orthogonally polarized beam bearing information about the shape and location of the object, and each individual co-propagating linearly orthogonally polarized beam having a distinct phase curvature from the other individual beam of the pair;
converting, using a wideband quarter waveplate, each pair of linearly orthogonally polarized beams into a pair of circularly orthogonally polarized beams using a wideband quarter waveplate without requiring wavelength calibration or otherwise changing their phase curvatures;
causing, using one of a linear polarizer or an art of differentially aligned micropolarizers, mutual interference between each individual of each pair of the circularly orthogonally polarized beams with the other individual of said pair, with controlled relative constant phase factors differing between the individuals;
recording at least one image of each the interference patterns by at least one imaging device; and
computationally operating on the recorded images of the interference patterns to produce holograms and reconstructed images of the object.

10. The method of claim 9, wherein the imposition of a linear polarization is practiced by directing the received electromagnetic radiation through a polarizing beam splitter that produces two differently linearly polarized portions of the electromagnetic radiation.

11. The method of claim 10, wherein:
each of the two polarized beams exiting the polarizing beam splitter is used as a said portion of the received electromagnetic radiation, and
wherein two pairs of orthogonally circularly polarized beams are produced, and wherein two imaging devices each produce at least one interference pattern from one or the other of the two portions.

12. The method of claim 11, wherein the images recorded by the two imaging devices are processed together by coincidence imaging to increase signal to noise ratio in the recording process.

13. The method of claim 11, wherein the images recorded by the two imaging devices are processed with compressive sensing methods to produce holograms and reconstructed images of the object.

14. The method of claim 9, wherein the imposition of a linear polarization is practiced by illuminating the sample with linearly polarized electromagnetic radiation.

15. The method of claim 9, wherein:
the causing mutual interference is practiced by directing each pair circularly orthogonally polarized beams through a linear polarizer and
wherein the recording of at least one image of the interference patterns is practiced by recording a single phase factor of each interference pattern in a single exposure.

16. The method of claim 9, wherein:
the causing mutual interference is practiced by directing each pair circularly orthogonally polarized beams through an array of small polarizing elements, with each element possessing one of a set of n different polarization orientations,
wherein each element is registered to a specific location in the plane of a means for recording of at least one image of the interference patterns, and
wherein the recording of at least one image of the interference patterns is practiced by recording n different phase factors of each interference pattern in a single exposure.

17. The method of claim 9, wherein:
the causing mutual interference is practiced by directing each pair circularly orthogonally polarized beams through an array of small polarizing elements, with each element possessing one of a set of n different polarization orientations,
wherein each element is registered to a specific location in the plane of a means for recording of at least one image of the interference patterns, and
wherein each location in the plane of said recording means simultaneously records multiple discrete colors, and
wherein the recording of at least one image of the interference patterns is practiced by recording n different phase factors of each interference pattern of each discrete color in a single exposure.

* * * * *